（12） United States Patent
Ito et al.

(10) Patent No.: US 9,496,065 B2
(45) Date of Patent: *Nov. 15, 2016

(54) POSITIVE ELECTRODE ACTIVE MATERIAL FOR ELECTRIC DEVICE, POSITIVE ELECTRODE FOR ELECTRIC DEVICE, AND ELECTRIC DEVICE

(75) Inventors: Atsushi Ito, Yokosuka (JP); Yasuhiko Ohsawa, Yokosuka (JP); Kenzo Oshihara, Novi, MI (US); Tomohiro Kaburagi, Yokohama (JP); Shinji Yamamoto, Yokosuka (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 191 days.

This patent is subject to a terminal disclaimer.

(21) Appl. No.: 14/130,643

(22) PCT Filed: Jul. 3, 2012

(86) PCT No.: PCT/JP2012/066970
§ 371 (c)(1),
(2), (4) Date: Jan. 2, 2014

(87) PCT Pub. No.: WO2013/005737
PCT Pub. Date: Jan. 10, 2013

(65) Prior Publication Data
US 2014/0131633 A1    May 15, 2014

(30) Foreign Application Priority Data

Jul. 4, 2011  (JP) ................ 2011-148094
Mar. 7, 2012  (JP) ................ 2012-050933
Jun. 29, 2012 (JP) ................ 2012-146881

(51) Int. Cl.
*H01B 1/08* (2006.01)
*C01G 51/00* (2006.01)
(Continued)

(52) U.S. Cl.
CPC ............. *H01B 1/08* (2013.01); *C01G 45/1235* (2013.01); *C01G 45/1257* (2013.01);
(Continued)

(58) Field of Classification Search
CPC ...... H01B 1/08; H01M 4/364; H01M 4/505; H01M 4/525; C01G 45/1235; C01G 45/1257; C01G 51/56; C01G 53/56
See application file for complete search history.

(56) References Cited

U.S. PATENT DOCUMENTS 7,368,071 B2  5/2008  Dahn et al.
7,476,467 B2  1/2009  Park et al.
(Continued)

FOREIGN PATENT DOCUMENTS

CN   101080830 A   11/2007
JP   2002124258 A   4/2002
(Continued)

OTHER PUBLICATIONS

"Layered Cathode Materials Li[NixLi(1/3-2x/3)Mn(2/3-x/3)]O2 for Lithium-Ion Batteries", Electrochemical and Solid-State Letters,4(11)pp. A191-A194(2001).

(Continued)

*Primary Examiner* — Mark Kopec
*Assistant Examiner* — Matthew R Diaz
(74) *Attorney, Agent, or Firm* — Young Basile Hanlon & MacFarlane, P.C.

(57) ABSTRACT

A positive electrode active material is provided for an electric device that contains a first active material comprising a transition metal oxide represented by formula (1): Li1.5[NiaCobMnc[Li]d]O3 (where a, b, c, and d satisfy the relationships: $0<d<0.5$; $a+b+c+d=1.5$; and $1.0<a+b+c<1.5$); and a second active material comprising a spinel transition metal oxide that has a crystal structure assigned to the space group Fd-3m, represented by formula (2): LiMa'Mn2−a'O4 (where M indicates at least one metal element having an atomic valence of 2-4, and a' satisfies the relationship $0=a'<2.0$). The fraction content of the first and second active material by mass ratio satisfies the relationship (3): 100:0<A:MB (A indicates the mass of the first active material and MB indicates the mass of the second active material).

10 Claims, 4 Drawing Sheets

(51) Int. Cl.
*C01G 53/00* (2006.01)
*C01G 45/12* (2006.01)
*H01M 4/505* (2010.01)
*H01M 4/36* (2006.01)
*H01M 4/525* (2010.01)
*H01M 4/02* (2006.01)
*H01G 11/06* (2013.01)
*H01G 11/46* (2013.01)
*H01G 11/50* (2013.01)
*H01M 10/0525* (2010.01)

(52) U.S. Cl.
CPC ............ *C01G 51/56* (2013.01); *C01G 53/56* (2013.01); *H01M 4/364* (2013.01); *H01M 4/505* (2013.01); *H01M 4/525* (2013.01); *H01G 11/06* (2013.01); *H01G 11/46* (2013.01); *H01G 11/50* (2013.01); *H01M 10/0525* (2013.01); *H01M 2004/021* (2013.01); *H01M 2220/20* (2013.01); *Y02E 60/122* (2013.01); *Y02E 60/13* (2013.01); *Y02T 10/7011* (2013.01); *Y02T 10/7022* (2013.01)

(56) References Cited

U.S. PATENT DOCUMENTS

| | | | | |
|---|---|---|---|---|
| 7,935,270 | B2* | 5/2011 | Park | H01M 4/131 |
| | | | | 252/182.1 |
| 7,955,734 | B2 | 6/2011 | Shimizu et al. | |
| 8,227,113 | B2 | 7/2012 | Shimizu et al. | |
| 8,530,092 | B2 | 9/2013 | Shimizu et al. | |
| 2006/0051671 | A1 | 3/2006 | Thackeray et al. | |
| 2006/0051673 | A1 | 3/2006 | Johnson et al. | |
| 2006/0099508 | A1 | 5/2006 | Thackeray et al. | |
| 2007/0099087 | A1 | 5/2007 | Mihara et al. | |
| 2008/0085452 | A1* | 4/2008 | Park | H01M 4/131 |
| | | | | 429/220 |
| 2009/0123842 | A1 | 5/2009 | Thackeray et al. | |
| 2010/0143784 | A1 | 6/2010 | Johnson et al. | |
| 2011/0212366 | A1 | 9/2011 | Shimizu et al. | |

FOREIGN PATENT DOCUMENTS

| | | |
|---|---|---|
| JP | 2004538610 A | 12/2004 |
| JP | 2007242581 A | 9/2007 |
| JP | 2008511960 A | 4/2008 |
| JP | 2011233234 A | 11/2011 |
| KR | 1020060044953 | 11/2007 |

OTHER PUBLICATIONS

Park et al.: "Lithium-manganese-nickel-oxide electrodes with integrated layered-spinel structures for lithium batteries", Electrochemistry Communications, Elsevier, Amsterdam, NL, vol. 9, No. 2, Feb. 7, 2007, pp. 262-268, XP005878764.

Li J et al.: "Synthesis and electrochemical performance of the high voltage cathode material Li[LiMnCo]Owith improved rate capability", Journal of Power Sources, Elsevier SA, CH, vol. 196, No. 10, Jan. 3, 2011, pp. 4821-4825, XP028185665.

Communication with Extended European Search Report dated Aug. 12, 2014, from the corresponding European Patent Application No. 12806982.0.

* cited by examiner

POSITIVE ELECTRODE ACTIVE MATERIAL FOR ELECTRIC DEVICE, POSITIVE ELECTRODE FOR ELECTRIC DEVICE, AND ELECTRIC DEVICE

CROSS REFERENCE TO RELATED APPLICATION

The present application claims priority to Japanese Patent Application Nos. 2011-148094, filed Jul. 4, 2011; 2012-050933, filed Mar. 7, 2012; and 2012-146881, filed Jun. 29, 2012; each incorporated herein in its entirety.

TECHNICAL FIELD

The present invention relates to a positive electrode active material, to a positive electrode for an electric device, and to an electric device. Specifically, the positive electrode active material of the present invention is suitably used as a positive electrode active material of a lithium ion secondary battery or a lithium ion capacitor, which serves as an electric device. Moreover, the electric device of the present invention is suitably used, for example, as an electric device for a vehicle such as an electric vehicle, a fuel cell vehicle and a hybrid electric vehicle.

BACKGROUND

In recent years, in order to cope with the air pollution and the global warming, it is sincerely desired that the emission amount of carbon dioxide be reduced. In the automobile industry, expectations are centered on such reduction of the emission amount of carbon dioxide by introduction of the electric vehicle (EV) and the hybrid electric vehicle (HEV). Therefore, development of an electric device such as a secondary battery for driving a motor, the electric device serving as a key for practical use of these vehicles, is assiduously pursued.

As the secondary battery for driving a motor, a lithium ion secondary battery having high theoretical energy attracts attention, and at present, development thereof rapidly progresses. In general, the lithium ion secondary battery has a configuration in which a positive electrode, a negative electrode and an electrolyte located therebetween are housed in a battery casing. Note that the positive electrode is formed by coating a surface of a current collector with positive electrode slurry containing a positive electrode active material, and the negative electrode is formed by coating a surface of a negative electrode current collector with negative electrode slurry containing a negative electrode active material.

In order to enhance capacity characteristics, output characteristics and the like of the lithium ion secondary battery, selection of the respective materials is extremely important.

Heretofore, a non-aqueous electrolyte secondary battery has been proposed, which has a hexagonal layered rock salt structure belonging to the space group R-3m, and contains Li in the 3b site in which transition metal is contained (for example, refer to Japanese Patent Unexamined Publication No. 2007-242581). This lithium-nickel-manganese composite oxide is represented by a formula $Li[Li_xNi_yMn_z]O_{2-a}$. Then, in the formula, x ranges: $0<x<0.4$; y ranges: $0.12<y<0.5$; z ranges: $0.3<z<0.62$; and a ranges: $0 \leq a<0.5$, which satisfy the following relationships: $x>(1-2y)/3$; $\frac{1}{4} \leq y/z \leq 1.0$; and $x+y+z=1.0$.

Moreover, heretofore, a cathode composition for a lithium ion battery has been proposed, which has a formula (a) $Li_yM^1_{(1-b)}Mn_b]O_2$ or a formula (b) $Li_x[M^1_{(1-b)}Mn_b]O_{1.5+c}$ (for example, refer to Japanese Patent Unexamined Publication No. 2004-538610). Note that, in the formulae, the following relationships are satisfied, which are: $0 \leq y<1$; $0<b<1$; and $0<c<0.5$, and $M^1$ denotes one or more types of metal elements. However, in the case of the formula (a), $M^1$ is metal elements other than chromium. Then, this composition has a single-phase form having an O3 crystal structure that does not cause phase transition to the spinel structure when a cycle operation of a predetermined complete charge/discharge cycle is performed.

SUMMARY

With the non-aqueous electrolyte secondary battery described in Japanese Patent Unexamined Publication No. 2007-242581, there has been a problem that a high capacity cannot be maintained since a crystal structure of the lithium-nickel-manganese composite oxide represented by the formula $Li[Li_xNi_yMn_z]O_{2-a}$ is not stabilized.

Moreover, in the examination by the inventors of the present invention, even in a lithium ion battery using the cathode composition for a lithium ion battery, which is described in Japanese Patent Unexamined Publication No. 2004-538610, there has been a problem that a discharge capacity, a discharge operation voltage and initial rate characteristics are not sufficient.

The present invention has been made in consideration of the problems as described above, which are inherent in the conventional technology. Then, it is an object of the present invention to provide a positive electrode active material for an electric device, which is capable of exerting excellent initial charge/discharge efficiency while maintaining a high capacity by maintaining a high reversible capacity. It is another object of the present invention to provide a positive electrode for an electric device, which uses the positive electrode active material for an electric device, and to provide an electric device.

A positive electrode active material for an electric device according to an aspect of the present invention contains a first active material and a second active material. The first active material is composed of a transition metal oxide represented by compositional formula (1):

$$Li_{1.5}[Ni_aCo_bMn_c[Li]_d]O_3 \qquad (1)$$

wherein Li is lithium, Ni is nickel, Co is cobalt, Mn is manganese, O is oxygen, a, b, c and d satisfy relationships: $0<d<0.5$; $a+b+c+d=1.5$; and $1.0<a+b+c<1.5$.

The second active material is composed of a spinel-type transition metal oxide represented by compositional formula (2) and having a crystal structure belonging to a space group Fd-3m:

$$LiM_{a'}Mn_{2-a'}O_4 \qquad (2)$$

wherein Li is lithium, M is at least one metal element with a valence of 2 to 4, Mn is manganese, O is oxygen, and a' satisfies a relationship: $0 \leq a'<2.0$.

Then, a content ratio of the first active material and the second active material satisfies, in a mass ratio, a relationship represented by expression (3):

$$100:0<M_A:M_B<0:100 \qquad (3)$$

wherein $M_A$ is a mass of the first active material and $M_B$ is a mass of the second active material.

BRIEF DESCRIPTION OF DRAWINGS

The description herein makes reference to the accompanying drawings wherein like reference numerals refer to like parts throughout the several views, and wherein.

DESCRIPTION OF EMBODIMENTS

Figure 1:
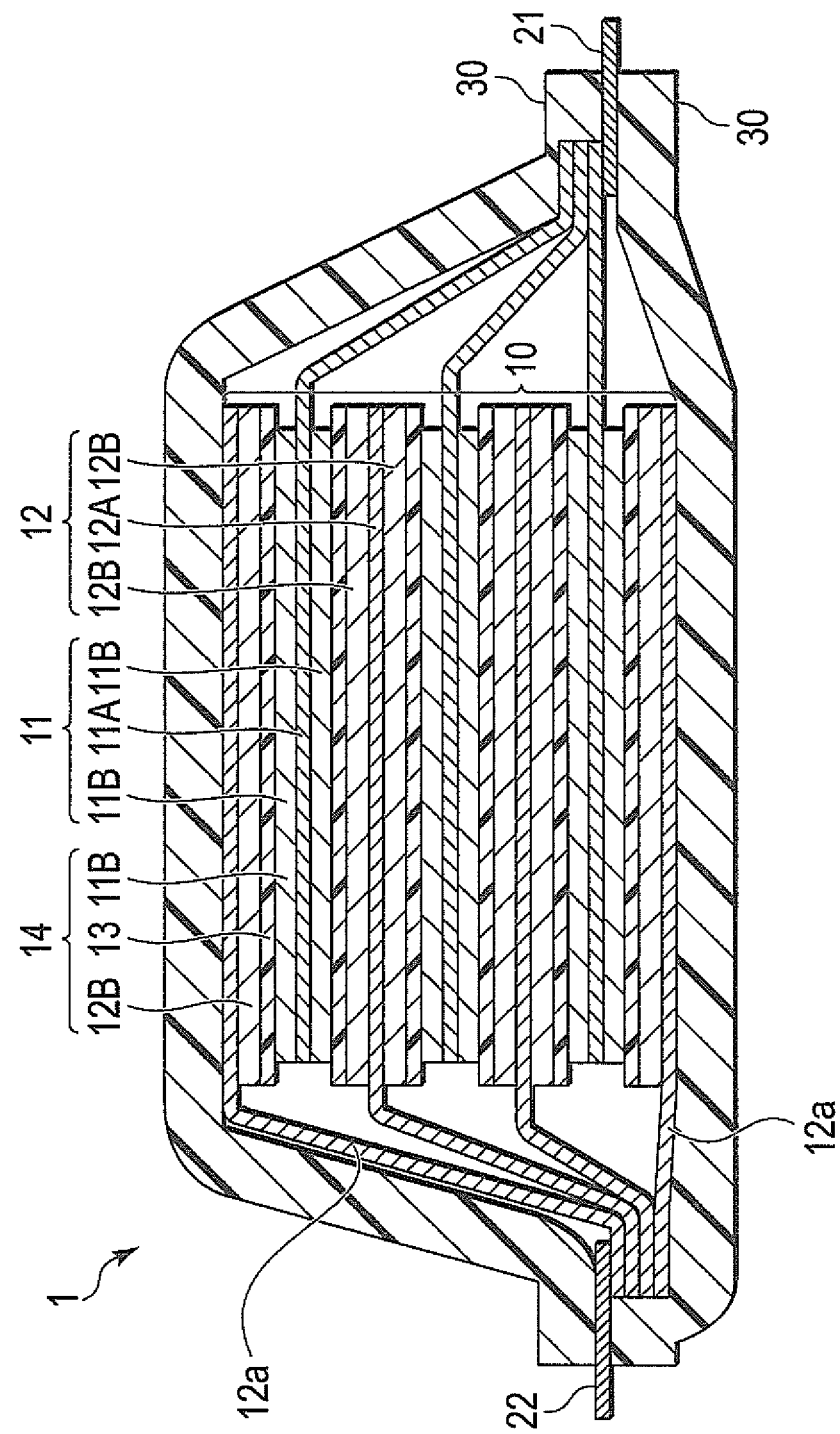
FIG. 1 is a schematic cross-sectional view showing an example of a lithium ion secondary battery according to an embodiment of the present invention.

A description is made in detail of a positive electrode active material for an electric device according to the present invention, of a positive electrode for an electric device, which uses the positive electrode active material, and an electric device. Here, the positive electrode active material for an electric device according to the present invention is applicable, for example, as a positive electrode active material of a lithium ion secondary battery as an electric device. Accordingly, the description of the above is made in detail while taking, as examples, the positive electrode active material for a lithium ion secondary battery, and the lithium ion secondary battery.

First Embodiment

First, a description is made of a positive electrode active material for a lithium ion secondary battery according to a first embodiment of the present invention. The positive electrode active material for a lithium ion secondary battery according to the first embodiment contains a first active material composed of a transition metal oxide represented by compositional formula (1). Moreover, the above-described positive electrode active material contains a second active material composed of a spinel-type transition metal oxide, which is represented by compositional formula (2), and has a crystal structure belonging to the space group Fd-3m:

where, in the formula (1), Li is lithium, Ni is nickel, Co is cobalt, Mn is manganese, and O is oxygen. Moreover, a, b, c and d satisfy relationships: $0<d<0.5$; $a+b+c+d=1.5$; and $1.0<a+b+c<1.5$.

where, in the formula (2), Li is lithium, M is at least one metal element with a valence of 2 to 4, Mn is manganese, and O is oxygen. Moreover, a' satisfies a relationship: $0 \le a'<2.0$.

Moreover, the positive electrode active material for a lithium ion secondary battery according to this embodiment is one in which a content ratio of the first active material and the second active material satisfies a relationship, which is represented by expression (3), in a mass ratio:

where, in the expression (3), $M_A$ is a mass of the first active material, and $M_B$ is a mass of the second active material.

In the case where the positive electrode active material as described above is used for the lithium ion secondary battery, the positive electrode active material is capable of exerting excellent initial charge/discharge efficiency while maintaining a high capacity by maintaining a high reversible capacity. Accordingly, the positive electrode active material is suitably used for the positive electrode for the lithium ion secondary battery. As a result, the lithium ion secondary battery can be suitably used as a lithium ion secondary battery for a drive power supply or auxiliary power supply of a vehicle. Besides, the lithium ion secondary battery is also sufficiently applicable as a lithium ion secondary battery oriented for a mobile instrument such as a cellular phone.

Here, in the case where d does not satisfy $0<d<0.5$ in compositional formula (1), a crystal structure of the first active material is not stabilized in some case. On the contrary, in the case where d satisfies $0<d<0.5$, the first active material is likely to become a layered transition metal oxide belonging to the space group C2/m. Note that, by the fact that the first active material is the layered transition metal oxide belonging to the space group C2/m, and further, is mixed with the above-described second active material, an irreversible capacity in an initial period is reduced more, whereby it is made possible to maintain the high reversible capacity.

Moreover, in compositional formula (1), in the case where d is 0.1 or more, that is to say, in the case where d satisfies $0.1 \le d<0.5$, a composition of the first active material is less likely to be approximate to $Li_2MnO_3$, and the charge/discharge becomes easy, and accordingly, this is preferable. Moreover, in the case where d is 0.45 or less, that is to say, in the case where d satisfies $0<d \le 0.45$, a charge/discharge capacity of the positive electrode active material per unit weight can be set at 200 mAh/g or more, which is higher than in the existing layered positive electrode active material, and accordingly, this is preferable. Note that, from the above-described viewpoint, in compositional formula (1), in the case where d satisfies $0.1 \le d \le 0.45$, the charge/discharge capacity can be increased while facilitating the charge/discharge, and accordingly, this is particularly preferable.

Moreover, in compositional formula (1), preferably, a+b+c satisfies $1.05 \le a+b+c \le 1.4$. Here, in general, it is known that, from viewpoints of enhancing material purity and enhancing electron conductivity, nickel (Ni), cobalt (Co) and manganese (Mn) contribute to a capacity and output characteristics of the lithium ion secondary battery. Then, by the fact that a+b+c satisfies $1.05 \le a+b+c \le 1.4$, the respective elements are optimized, and the capacity and the output characteristics can be enhanced more. Hence, in the case where the positive electrode active material containing the first active material that satisfies this relationship is used for the lithium ion secondary battery, then the high reversible capacity is maintained, whereby it is made possible to exert the excellent initial charge/discharge efficiency while maintaining the high capacity.

Note that, if the relationships: $a+b+c+d=1.5$; and $1.0<a+b+c<1.5$ are satisfied in compositional formula (1), then values of a, b and c are not particularly limited. However, preferably, a satisfies $0<a<1.5$. Note that, in the case where a does not satisfy $a \le 0.75$, since nickel is contained in the positive electrode active material within a range of d described above under a condition where nickel (Ni) is divalent, the crystal structure of the first active material is not stabilized in some case. Note that, in the case where a satisfies $a \le 0.75$, the first active material is likely to become the layered transition metal oxide belonging to the space group C2/m in terms of the crystal structure.

Moreover, in compositional formula (1), preferably, b satisfies $0 \le b<1.5$. However, in the case where b does not satisfy $b \le 0.5$, then the crystal structure is not stabilized in some case since nickel is contained in the positive electrode active material within the range of d described above under the condition where nickel (Ni) is divalent, and further, since cobalt (Co) is contained in the positive electrode active material. Note that in the case where b satisfies b≤0.5, the first active material is likely to become the layered transition metal oxide belonging to the space group C2/m in terms of the crystal structure.

Moreover, in compositional formula (1), preferably, c satisfies 0<c<1.5. However, in the case where c does not satisfy c≤1.0, nickel and cobalt are contained in the positive electrode active material within the range of d described above under the condition where nickel is divalent. Moreover, manganese (Mn) is contained in the positive electrode active material within the range of d described above under a condition where manganese is tetravalent. Therefore, the crystal structure of the positive electrode active material is not stabilized in some case. Note that, in the case where c satisfies c≤1.0, the first active material is likely to become the layered transition metal oxide belonging to the space group C2/m in terms of the crystal structure.

Furthermore, in compositional formula (1), preferably, the relationship: a+b+c+d=1.5 is satisfied from a viewpoint of stabilizing the crystal structure of the first active material.

Moreover, in compositional formula (2), in the case where a' does not satisfy 0≤a'<2.0, then in terms of the crystal structure, the second active material does not become the spinel-type transition metal oxide belonging to the space group Fd-3m. Note that, in the case where a' is 0.2 or less, that is, in the case where a' satisfies 0≤a'≤0.2, the charge/discharge capacity of the positive electrode active material per unit weight can be set at 200 mAh/g or more, which is higher than in the existing layered positive electrode active material, and accordingly, this is preferable.

Furthermore, in compositional formula (2), M is at least one metal element with a valence of 2 to 4. As suitable examples of the metal element as described above, for example, nickel (Ni), cobalt (Co), zinc (Zn) and aluminum (Al) can be mentioned. In the positive electrode active material, these may be each contained singly, or two or more thereof may be contained in combination.

Moreover, in the lithium ion secondary battery of this embodiment, the content ratio of the first active material and the second active material satisfies the relationship, which is represented by expression (3), in the mass ratio. However, from a viewpoint of enabling exertion of superior initial charge/discharge efficiency, preferably, the content ratio satisfies a relationship represented by expression (4). Moreover, from the viewpoint of enabling the exertion of the superior initial charge/discharge efficiency, more preferably, the content ratio satisfies a relationship represented by expression (5):

$$100:0<M_A:M_B<0:100 \quad (3)$$

$$100:0<M_A:M_B<50:50 \quad (4)$$

$$100:0<M_A:M_B<85:15 \quad (5)$$

wherein $M_A$ is the mass of the first active material and $M_B$ is the mass of the second active material.

At the present point of time, in the positive electrode active material of this embodiment, it is considered that effects thereof are obtained by a mechanism which is described as below. However, even a case where the effects are obtained without depending on the mechanism which is described as below is incorporated within the scope of the present invention.

First, in the positive electrode active material of this embodiment, it is considered necessary that there coexist: the first active material that has the crystal structure containing extra lithium (Li), which is irreversible; and the second active material that has the crystal structure having a defect or a site, into which lithium is insertable. That is to say, when there coexist the first active material and the second active material, which are as described above, then at least a part of the extra lithium, which is irreversible, in the first active material is inserted into the defect or site of the second active material, into which lithium is insertable, and an amount of such irreversible lithium is reduced. In such a way, the high reversible capacity can be maintained, and the high capacity can be maintained. Moreover, the following is considered. Specifically, even if the amount of the irreversible lithium is reduced, the first active material that has the crystal structure containing the extra lithium is contained, and accordingly, the initial charge/discharge efficiency is enhanced.

Moreover, in the case where the mechanism for inserting the lithium, the mechanism being as mentioned above, is considered, preferably, the first active material and the second active material are arranged close to each other. Hence, preferably, particles of the first active material and particles of the second active material are mixed with each other, and the first active material and the second active material are contained in a state where the particles of both thereof are brought into contact with each other; however, the state of the first active material and the second active material is not limited to this, and may be non-uniform. For example, the first active material and the second active material may be arranged so as to be stacked on each other. That is to say, in the positive electrode of the lithium ion secondary battery, a layer containing the first active material and a layer containing the second active material may be stacked on each other in a state of being brought into direct contact with each other. In the case where the mechanism for inserting the lithium, the mechanism being as mentioned above, is considered, it is considered that, preferably, the first active material is arranged on a current collector side to be described later, and the second active material is arranged on an electrolyte layer side to be described later.

Next, while referring to the drawings, a description is made in detail of the positive electrode for the lithium ion secondary battery according to the embodiment of the present invention and of the lithium ion secondary battery according thereto. Note that dimensional ratios in the drawings, which are incorporated by reference in the following embodiments, are exaggerated for convenience of explanation, and are different from actual ratios in some case.

[Configuration of Lithium Ion Secondary Battery]

FIG. 1 shows the lithium ion secondary battery according to the embodiment of the present invention. Note that the lithium ion secondary battery as described above is called a laminate-type lithium ion secondary battery.

As shown in FIG. 1, the lithium ion secondary battery 1 of this embodiment has a configuration in which a battery element 10 attached with a positive electrode lead 21 and a negative electrode lead 22 is enclosed in an inside of an exterior body 30 formed of a laminated film. Then, in this embodiment, the positive electrode lead 21 and the negative electrode lead 22 are drawn out in opposite directions to each other from the inside of the exterior body 30 to an outside thereof. Note that, though not shown, the positive electrode lead and the negative electrode lead may be drawn out in the same direction from the inside of the exterior body to the outside thereof. Moreover, the positive electrode lead and the negative electrode lead, which are as described above, can be attached onto positive electrode current collectors and negative electrode current collectors, which are to be described later, for example, by ultrasonic welding, resistance welding and the like.

[Positive Electrode Lead and Negative Electrode Lead]

The positive electrode lead 21 and the negative electrode lead 22 are composed, for example, of a metal material such as aluminum (Al), copper (Cu), titanium (Ti), nickel (Ni), alloys thereof and stainless steel (SUS). However, the metal material is not limited to these, and materials, which have been heretofore known in public and are used as the leads for the lithium ion secondary battery, can be used.

Note that, as the positive electrode lead and the negative electrode lead, those formed of the same material may be used, or those formed of different materials may be used. Moreover, as in this embodiment, the leads, which are prepared separately, may be connected to the positive electrode current collectors and the negative electrode current collectors, or alternatively, the leads may be formed by individually extending the respective positive electrode current collectors and the respective negative electrode current collectors, which are to be described later. Although not shown, preferably, the positive electrode lead and the negative electrode lead on portions of being taken out from the exterior body are coated with heat-resistant and insulating thermal shrinkage tubes and the like so as not to affect products (for example, automotive components, and in particular, electronic components and the like) by causing a current leakage and so on by contacting peripheral instruments, wires and the like.

Moreover, though not shown, current collector plates may be used for the purpose of taking a current to an outside of the battery. The current collector plates are electrically connected to the current collectors and the leads, and are taken out to an outside of the laminated film as an outer package material of the battery. A material that composes the current collector plates is not particularly limited, and a highly electrically conductive material, which is known in public and has heretofore been used as current collector plates for the lithium ion secondary battery, can be used. As such a constituent material of the current collector plates, for example, a metal material such as aluminum (Al), copper (Cu), titanium (Ti), nickel (Ni), alloys thereof, and stainless steel (SUS) is preferable, and from viewpoints of light weight, corrosion resistance and high conductivity, aluminum, copper or the like is more preferable. Note that, for the positive electrode current collector plate and the negative electrode current collector plate, the same material may be used, or different materials may be used.

[Exterior Body]

Preferably, the exterior body 30 is formed, for example, of a film-like outer package material from viewpoints of miniaturization and weight reduction. However, the exterior body is not limited to this, and a material, which has been heretofore known in public and is used for the exterior body for the lithium ion secondary battery, can be used. That is to say, a metal can case can also be applied.

Note that, from a viewpoint of being excellent in output enhancement and cooling performance, and of being suitably usable for a battery for a large instrument such as an electric vehicle and a hybrid electric vehicle, a polymer-metal composite laminated film excellent in thermal conductivity can be mentioned as the exterior body. More specifically, an exterior body can be suitably used, which is formed of a laminated film with a three-layer structure composed by stacking polypropylene as a thermocompression layer, aluminum as a metal layer and Nylon as an outer protection layer on one another in this order.

Note that, in place of the above-mentioned laminated film, the exterior body may be composed of another structure, for example, a laminated film that does not have a metal material, a polymer film such as polypropylene, a metal film or the like.

Here, a general configuration of the exterior body can be represented by a stacked structure of the outer protection layer/the metal layer/the thermocompression layer. However, in some case, the outer protection layer is composed of plural layers, and the thermocompression layer is composed of plural layers. Note that it is sufficient if the metal layer functions as an impermeable barrier film, and not only aluminum foil but also stainless steel foil, nickel foil, plated iron foil and the like can be used. However, as the metal layer, the aluminum foil, which is thin, lightweight and excellent in workability, can be suitably used.

Configurations usable as the exterior body are listed below in the format of (outer protection layer/metal layer/thermocompression layer): Nylon/aluminum/unstretched polypropylene; polyethylene terephthalate/aluminum/unstretched polypropylene; polyethylene terephthalate/aluminum/polyethylene terephthalate/unstretched polypropylene; polyethylene terephthalate/Nylon/aluminum/unstretched polypropylene; polyethylene terephthalate/Nylon/aluminum/Nylon/unstretched polypropylene; polyethylene terephthalate/Nylon/aluminum/Nylon/polyethylene; Nylon/polyethylene/aluminum/straight-chain low-density polyethylene; polyethylene terephthalate/polyethylene/aluminum/polyethylene terephthalate/low-density polyethylene; polyethylene terephthalate/Nylon/aluminum/low-density polyethylene/unstretched polypropylene; and the like.

[Battery Element]

As shown in FIG. 1, the battery element 10 has a configuration in which positive electrodes 11, electrolyte layers 13 and negative electrodes 12 are stacked on one another. Here, in each of the positive electrodes 11, positive electrode active material layers 11B are formed on both of main surfaces of a positive electrode current collector 11A, and in each of the negative electrodes 12, negative electrode active material layers 12B are formed on both of main surfaces of a negative electrode current collector 12A. At this time, the positive electrode active material layer 11B, which is formed on one of the main surfaces of the positive electrode current collector 11A in one positive electrode 11, and the negative electrode active material layer 12B, which is formed on one of the main surfaces of the negative electrode current collector 12A in the negative electrode adjacent to the one positive electrode 11, face each other while interposing the electrolyte layer 13 there between. In such a way, pluralities of the positive electrodes, the electrolyte layers and the negative electrodes are stacked on one another in this order.

In such a way, the positive electrode active material layer 11B, the electrolyte layer 13 and the negative electrode active material layer 12B, which are adjacent to one another, compose one single cell layer 14. Hence, the lithium ion secondary battery 1 of this embodiment becomes one, in which a plurality of the single cell layers 14 are stacked on one another, and are thereby electrically connected in parallel to one another. Note that each of the positive electrodes and the negative electrodes may be one, in which each of the active material layers is formed on one of the main surfaces of each current collector. In this embodiment, for example, on a negative electrode current collector 12a located on an outermost layer of the battery element 10, the negative electrode active material layer 12B is formed on only one surface thereof.

Moreover, though not shown, on outer circumferences of the single cell layers, there may be provided insulating layers for insulating the positive electrode current collectors and the negative electrode current collectors, which are adjacent to each other, from each other. Preferably, the insulating layers as described above are formed of a material, which holds an electrolyte contained in the electrolyte layers and the like, and prevents liquid leakage of the electrolyte to the outer circumferences of the single cell layers. Specifically, usable are: general-purpose plastics such as polypropylene (PP), polyethylene (PE), polyurethane (PUR), polyamide-based resin (PA), polytetrafluoroethylene (PTFE), polyvinylidene fluoride (PVDF) and polystyrene (PS); thermoplastic olefin rubber; and the like. Moreover, silicone rubber can also be used.

[Positive Electrode Current Collector and Negative Electrode Current Collector]

The positive electrode current collectors 11A and the negative electrode current collectors 12A are composed of an electrically conductive material. A size of the current collectors can be determined in response to a usage purpose of the battery. For example, if the current collectors are used for a large battery for which a high energy density is required, then the current collectors with a large area are used. A thickness of the current collectors is not particularly limited, either. In usual, the thickness of the current collectors approximately ranges from 1 to 100 μm. A shape of the current collectors is not particularly limited, either. In the battery element 10 shown in FIG. 1, besides current collector foil, those with a mesh pattern (expand grid and the like) and the like can be used. Note that, in the case where a thin film alloy as an example of the negative electrode active material is directly formed on the negative electrode current collectors 12A by the sputtering method and the like, it is desirable to use the current collector foil.

Such a material that composes the current collectors is not particularly limited. For example, metal can be employed, and resin can be employed, in which an electrically conductive filler is added to an electrically conductive polymer material or a non-electrically conductive polymer material. Specifically, as metal, there are mentioned aluminum (Al), nickel (Ni), iron (Fe), stainless steel (SUS), titanium (Ti), copper (Cu) and the like. Besides these, it is preferable to use a clad material of nickel and aluminum, a clad material of copper and aluminum, a plated material in which these metals are combined with one another, and the like. Moreover, the metal may be foil in which aluminum is coated on a surface of metal. Among them, aluminum, stainless steel, copper and nickel are preferable from viewpoints of the electron conductivity, a battery operation potential and the like.

Moreover, as the electrically conductive polymer material, for example, there are mentioned polyaniline, polypyrrole, polythiophene, polyacetylene, polyparaphenylene, polyphenylene vinylene, polyacrylonitrile, polyoxadiazole and the like. Such electrically conductive polymer materials have sufficient conductivity even if the electrically conductive filler is not added thereto, and accordingly, are advantageous in a point of facilitation of the manufacturing process or of weight reduction of the current collectors.

As the non-electrically conductive polymer material, for example, there are mentioned polyethylene (PE: high-density polyethylene (HDPE), low-density polyethylene (LDPE) and the like), polypropylene (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinylidene chloride (PVC), polyvinylidene fluoride (PVDF), polystyrene (PS), and the like. Such non-electrically conductive polymer materials have excellent potential resistance and solvent resistance.

According to needs, the electrically conductive filler can be added to the electrically conductive polymer material or the non-electrically conductive polymer material, which is described above. In particular, in the case where resin that serves as a base material of the current collectors is composed of only the non-conductive electrically polymer, the electrically conductive filler becomes necessarily essential in order to impart the conductivity to the resin. As long as being a material having the conductivity, the electrically conductive filler can be used without receiving limitations in particular. For example, as a material excellent in conductivity, potential resistance or lithium ion barrier properties, there are mentioned metal, electrically conductive carbon and the like.

As the metal to be used as the electrically conductive filler, there can be mentioned at least one metal selected from the group consisting of nickel (Ni), titanium (Ti), aluminum (Al), copper (Cu), platinum (Pt), iron (Fe), chromium (Cr), tin (Sn), zinc (Zn), indium (In), antimony (Sb) and potassium (K). Moreover, alloys or metal oxides, which contain these metals, can also be mentioned as preferred examples.

Moreover, as a preferred example of the electrically conductive carbon, there can be mentioned at least one selected from the group consisting of acetylene black, Vulcan, Black Pearl, carbon nanofiber, Ketjen Black, carbon nanotube, carbon nano-horn, carbon nano-balloon and fullerene. A loading amount of the electrically conductive filler is not particularly limited as long as being an amount by which sufficient conductivity can be imparted to the current collectors, and in general, approximately ranges from 5 to 35% by mass. However, the current collectors are not limited to these, and materials, which have been heretofore known in public and are used as the current collectors for the lithium ion secondary battery, can be used.

[Positive Electrode Active Material Layer]

The positive electrode active material layer 11B contains, as the positive electrode active material, the positive electrode active materials for a lithium ion secondary battery according to the above-mentioned first embodiment and to a second embodiment to be described later. Then, the positive electrode active material 11B may contain a binder or an electric conducting additive according to needs.

Note that, as long as effects of the present invention are exerted, the positive electrode active material may contain another positive electrode active material in addition to the positive electrode active materials for a lithium ion secondary battery according to the first embodiment and the second embodiment. As such another positive electrode active material, for example, a lithium-containing compound is preferable from viewpoints of the capacity and the output characteristics. As the lithium-containing compound as described above, for example, there are mentioned: a composite oxide containing lithium and a transition metal element; a phosphate compound containing lithium and the transition metal element; and a sulfate compound containing lithium and the transition metal element. However, from a viewpoint of obtaining higher capacity and output characteristics, such a lithium-transition metal composite oxide is particularly preferable. As a matter of course, the positive electrode active material layer containing, as the positive electrode active material, only at least one of the positive electrode active materials for a lithium ion secondary battery according to the first embodiment and the second embodiment is also incorporated within the scope of the present invention.

As a specific example of the composite oxide containing lithium and the transition metal element, a lithium cobalt composite oxide ($LiCoO_2$), a lithium nickel composite oxide ($LiNiO_2$), a lithium nickel cobalt composite oxide ($LiNiCoO_2$) and the like are mentioned. Moreover, as specific examples of the phosphate compound containing lithium and the transition metal element, a lithium iron phosphate compound ($LiFePO_4$), a lithium iron manganese phosphate compound ($LiFeMnPO_4$) and the like are mentioned. Note that, for such a purpose of stabilizing structures of these composite oxides, those in which other elements are partially substituted for the transition metals can also be mentioned.

The binder is not particularly limited; however, the following materials are mentioned. For example, there are mentioned thermoplastic polymers such as: polyethylene (PE), polypropylene (PP), polyethylene terephthalate (PET), polyether nitrile (PEN), polyacrylonitrile (PAN), polyimide (PI), polyamide (PA), cellulose, carboxymethyl cellulose (CMC), an ethylene-vinyl acetate copolymer, polyvinylidene chloride (PVC), styrene-butadiene rubber (SBR), isoprene rubber, butadiene rubber, ethylene-propylene rubber, an ethylene-propylene-diene copolymer, a styrene-butadiene-styrene block copolymer and a hydrogen-added product thereof, and a styrene-isoprene-styrene block copolymer and a hydrogen-added product thereof. Moreover, there are mentioned fluorine resins such as polyvinylidene fluoride (PVDF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF). Furthermore, there are mentioned: vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TEF-based rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFT-TFE-based fluorine rubber), vinylidene fluoride-perfluoromethyl vinyl ether-tetrafluoroethylene-based rubber (VDF-PFMVE-TFE-based fluorine rubber), and vinylidene fluoride-chlorotrifluoroethylene-based fluorine rubber (VDF-CTFE-based fluorine rubber); epoxy resin; and the like. Among them, more preferably, the binder is polyvinylidene fluoride, polyimide, styrene-butadiene rubber, carboxymethyl cellulose, polypropylene, polytetrafluoroethylene, polyacrylonitrile, and polyamide. These preferred binders are excellent in heat resistance, further have extremely wide potential windows, are stable at both of the positive electrode potential and the negative electrode potential, and are usable for the positive electrode active material layer and the negative electrode active material layer. However, the binder is not limited to these, and materials, which are known in public and have been heretofore used as the binder for the lithium ion secondary battery, can be used. These binders may be each used singly, or two or more thereof may be used in combination.

An amount of the binder contained in the positive electrode active material layer is not particularly limited as long as the binder can bind the positive electrode active material. However, the amount of binder is preferably 0.5 to 15% by mass, more preferably 1 to 10% by mass with respect to the positive electrode active material layer.

The electric conducting additive is one to be blended in order to enhance the conductivity of the positive electrode active material layer. As the electric conducting additive, for example, there can be mentioned carbon materials such as: carbon black including acetylene black; graphite; and vapor deposited carbon fiber. When the positive electrode active material layer contains the electric conducting additive, an electron network in the inside of the positive electrode active material layer is formed effectively, and such containing of the electric conducting additive can contribute to the enhancement of the output characteristics of the battery. However, the electric conducting additive is not limited to these, and materials, which have been heretofore known in public and are used as the electric conducting additives for the lithium ion secondary battery, can be used. These electric conducting additives may be each used singly, or two or more thereof may be used in combination.

Moreover, an electrically conductive binder, which has functions of the above-described electric conducting additive and binder in combination, may be used in place of these electric conducting additive and binder, or may be used in combination with one or both of these electric conducting additive and binder. As the electrically conductive binder, for example, commercially available TAB-2 made by Hohsen Corporation can be used.

Furthermore, it is suitable that a density of the positive electrode active material layer be 2.5 $g/cm^3$ or more to 3.0 $g/cm^3$ or less. In the case where the density of the positive electrode active material layer is 2.5 $g/cm^3$ or more, weight (filler content) thereof per unit volume is increased, whereby it is made possible to enhance the discharge capacity. Moreover, in the case where the density of the positive electrode active material layer is 3.0 $g/cm^3$ or less, reduction of a void amount of the positive electrode active material layer is prevented, whereby permeability of a non-aqueous electrolysis solution and diffusivity of lithium ions can be enhanced.

[Negative Electrode Active Material Layer]

The negative electrode active material layer 12B contains, as the negative electrode active material, a negative electrode material capable of absorbing and releasing lithium, and may contain a binder and an electric conducting additive according to needs. Note that, as the binder and the electric conducting additive, those mentioned above can be used.

As the negative electrode material capable of absorbing and releasing lithium, for example, there can be mentioned carbon materials such as graphite (natural graphite, artificial graphite and the like) as high crystalline carbon, low crystalline carbon (soft carbon, hard carbon), carbon black (Ketjen black, acetylene black, channel black, lamp black, oil furnace black, thermal black and the like), fullerene, carbon nanotube, carbon nanofiber, carbon nano-horn, and carbon fibril. Note that the carbon materials include one containing 10% by mass or less silicon nanoparticles. Moreover, there can be mentioned: simplexes of elements which make alloys with lithium, the elements including silicon (Si), germanium (Ge), tin (Sn), lead (Pb), aluminum (Al), indium (In), zinc (Zn), hydrogen (H), calcium (Ca), strontium (Sr), barium (Ba), ruthenium (Ru), rhodium (Rh), iridium (Ir), palladium (Pd), platinum (Pt), silver (Ag), gold (Au), cadmium (Cd), mercury (Hg), gallium (Ga), thallium (Tl), carbon (C), nitrogen (N), antimony (Sb), bismuth (Bi), oxygen (O), sulfur (S), selenium (Se), tellurium (Te), chlorine (Cl) and the like; and oxides (silicon monoxide (SiO), $SiO_x$ (0<x<2), tin dioxide ($SnO_2$), $SnO_x$ (0<x<2), $SnSiO_3$ and the like), carbides (silicon carbide (SiC) and the like) and the like, which contain these elements. Furthermore, metal materials such as lithium metal and lithium-transition metal composite oxides such as lithium-titanium composite oxides (lithium titanate: $Li_4Ti_5O_{12}$) can be mentioned. However, the negative electrode active material is not limited to these, and materials, which have been heretofore known in public and are used as the negative electrode active material for the lithium ion secondary battery, can be used. These negative electrode active materials may be each used singly, or two or more thereof may be used in combination.

Moreover, in this embodiment, suitably, the carbon material is made of a graphite material, which is coated with an amorphous carbon layer, and does not have a scale shape. Moreover, suitably, a BET specific surface area of the carbon material is 0.8 $m^2/g$ or more to 1.5 $m^2/g$ or less, and a tap density thereof 0.9 $g/cm^3$ or more to 1.2 $g/cm^3$ or less. The carbon material made of the graphite material, which is coated with an amorphous carbon layer, and does not have a scale shape, is preferable since lithium ion diffusivity to a graphite-layered structure is high. Moreover, if the BET specific surface area of the carbon material as described above is 0.8 $m^2/g$ or more to 1.5 $m^2/g$ or less, then such a capacity retention ratio can be further enhanced. Furthermore, if the tap density of the carbon material as described above is 0.9 $g/cm^3$ or more to 1.2 $g/cm^3$ or less, then weight (filler content) thereof per unit volume can be enhanced, and the discharge capacity can be enhanced.

Furthermore, in this embodiment, suitably, a BET specific surface area of the negative electrode active material layer, which at least contains the carbon material and the binder, is 2.0 $m^2/g$ or more to 3.0 $m^2/g$ or less. By the fact that the BET specific surface area of the negative electrode active material layer is 2.0 $m^2/g$ or more to 3.0 $m^2/g$ or less, the permeability of the non-aqueous electrolysis solution can be enhanced, the capacity retention ratio can be further enhanced, and generation of gas owing to decomposition of the non-aqueous electrolysis solution can be suppressed.

Moreover, in this embodiment, suitably, a BET specific surface area of the negative electrode active material layer, which at least contains the carbon material and the binder, the BET specific surface area being obtained after the negative electrode active material layer is pressure-molded, 2.01 $m^2/g$ or more to 3.5 $m^2/g$ or less. The BET specific surface area of the negative electrode active material layer thus already press-molded is set at 2.01 $m^2/g$ or more to 3.5 $m^2/g$ or less, whereby the permeability of the non-aqueous electrolysis solution can be enhanced, the capacity retention ratio can be further enhanced, and the generation of gas owing to the decomposition of the non-aqueous electrolysis solution can be suppressed.

Furthermore, in this embodiment, suitably, an increment of the BET specific surface area concerned before and after the negative electrode active material layer, which at least contains the carbon material and the binder, is pressure-molded, is 0.01 $m^2/g$ or more to 0.5 $m^2/g$ or less. In such a way, the BET specific surface area after the negative electrode active material layer is pressure-molded can be set at 2.01 $m^2/g$ or more to 3.5 $m^2/g$ or less, whereby the permeability of the non-aqueous electrolysis solution can be enhanced, the capacity retention ratio can be further enhanced, and the generation of gas owing to the decomposition of the non-aqueous electrolysis solution can be suppressed.

Moreover, a thickness of each of the active material layers (each active material layer on one on the surfaces of each current collector) is not particularly limited, either, and knowledge heretofore known in public about the battery can be referred to as appropriate. An example of the thickness is mentioned. In usual, the thickness of each active material layer approximately ranges from 1 to 500 μm, preferably 2 to 100 μm in consideration of the usage purpose of the battery (output is regarded important, energy is regarded important, and so on), and of ion conductivity.

Moreover, in the case where optimum particle diameters are different among the respective active materials in the event of developing the effects individually intrinsic to the active materials, the active materials just need to be mixed and used while setting the optimum particle diameters in the event of developing the effects individually intrinsic thereto. Accordingly, it is not necessary to uniform the particle diameters of all of the active materials.

For example, in the case of the positive electrode active materials of the first and second embodiments and other positive electrode active materials, mean particle diameters thereof just need to be substantially the same as a mean particle diameter of the positive electrode active material contained in the existing positive electrode active material layer, and is not particularly limited. The mean particle diameter just needs to preferably range from 1 to 20 μm from the viewpoint of the output enhancement. Note that "the particle diameter" stands for a maximum distance among distances, each of which is between arbitrary two points on outlines of the active material particles (observed surfaces) observed by using observing means such as a scanning electron microscope (SEM) and a transmission electron microscope (TEM). As a value of "the mean particle diameter", a value is employed, which is calculated as a mean value of particle diameters of particles observed in several to several ten visual fields by using the observing means such as the scanning electron microscope and the transmission electron microscope. Particle diameters and mean particle diameters of the other constituent components can also be defined in a similar way.

However, the mean particle diameters are never limited to the range as described above, and may go out of this range as long as the functions and effects of this embodiment can be developed effectively.

[Electrolyte Layer]

As the electrolyte layer 13, for example, there can be mentioned: one in which an electrolysis solution is held in a separator; and one in which a layer structure is formed by using a polymer gel electrolyte and a solid polymer electrolyte. Moreover, one in which a laminated structure is formed by using a polymer gel electrolyte and a solid polymer electrolyte can be mentioned.

Preferably, the electrolysis solution is one, which is usually used in the lithium ion secondary battery. Specifically, the electrolysis solution has a form in which a supporting salt (lithium salt) is dissolved into an organic solvent. As the lithium salt, for example, there can be mentioned at least one lithium salt selected from inorganic acid anion salts such as lithium hexafluorophosphate ($LiPF_6$), lithium tetrafluoroborate ($LiBF_4$), lithium perchlorate ($LiClO_4$), lithium hexafluoarsenate ($LiAsF_6$), lithium hexafluorotantalate ($LiTaF_6$), lithium tetrachloroaluminate ($LiAlCl_4$) and lithium decachlorodecaborate ($Li_2B_{10}Cl_{10}$), and the like. Moreover, there can be mentioned at least one lithium salt selected from organic acid anion salts such as lithium trifluoromethane sulfonate ($LiCF_3SO_3$), lithium bis(trifluoromethanesulfonyl)imide ($Li(CF_3SO_2)_2N$) and lithium bis(pentafluoroethanesulfonyl)imide ($Li(C_2F_5SO_2)_2N$), and the like. Among them, lithium hexafluorophosphate ($LiPF_6$) is preferable. Moreover, as the organic solvent, for example, there can be used at least one organic solvent selected from the group consisting of cyclic carbonates, fluorine-containing cyclic carbonates, chain carbonates, fluorine-containing chain carbonates, aliphatic carboxylate esters, fluorine-containing aliphatic carboxylate esters, γ-lactones, fluorine-containing γ-lactones, cyclic ethers, fluorine-containing cyclic ethers, chain ethers and fluorine-containing chain ethers. As the cyclic carbonates, for example, propylene carbonate (PC), ethylene carbonate (EC) and butylene carbonate (BC) can be mentioned. Moreover, as the fluorine-containing cyclic carbonates, for example, fluoroethylene carbonate (FEC) can be mentioned. Furthermore, as the chain carbonates, for example, there can be mentioned dimethyl carbonate (DMC), diethyl carbonate (DEC), ethyl methyl carbonate (EMC), methyl propyl carbonate (MPC), ethyl propyl carbonate (EPC) and dipropyl carbonate (DPC). Moreover, as the aliphatic carboxylate esters, for example, methyl formate, methyl acetate and ethyl propionate can be mentioned. Moreover, as the γ-lactones, for example, γ-butyrolactone can be mentioned. Furthermore, as the cyclic ethers, for example, tetrahydrofuran, 2-methyltetrahydrofuran, 1,4-dioxane can be mentioned. Moreover, as the chain ethers, for example, 1,2-ethoxyethane (DEE), ethoxymethoxyethane (EME), diethylether, 1,2-dimethoxyethane and 1,2-dibutoxyethane can be mentioned. Besides the above, nitriles such as acetonitrile and amides such as dimethylformamide can be mentioned. These can be each used singly, or two or more thereof can be used in combination.

Moreover, an additive may be added to the electrolysis solution. As the additive, there can be mentioned: an organic sulfone-based compound such as a sultone derivative and cyclic sulfonate ester; an organic disulfone-based compound such as a disultone derivative and cyclic disulfonate ester; a vinylene carbonate derivative; an ethylene carbonate derivative; an ester derivative; a divalent phenol derivative; an ethylene glycol derivative; a terphenyl derivative; a phosphate derivative; and the like. Each of these forms a coating film on the surface of the negative electrode active material, and accordingly, the generation of the gas in the battery is reduced, and the enhancement of the capacity retention ratio can be further enhanced.

As the organic sulfone-based compound serving as the additive, for example, 1,3-propane sulfone (saturated sultone) and 1,3-propene sultone (unsaturated sultone) can be mentioned. Moreover, as the organic disulfone-based compound, for example, methane disulfonic acid methylene can be mentioned. Furthermore, as the vinylene carbonate derivative, for example, vinylene carbonate (VC) can be mentioned. Moreover, as the ethylene carbonate derivative, for example, fluoroethylene carbonate (FEC) can be mentioned. Furthermore, as the ester derivative, for example, there can be mentioned 4-biphenylyl acetate, 4-biphenylyl benzoate, 4-biphenylyl benzyl carboxylate and 2-biphenylyl propionate can be mentioned. Moreover, as the divalent phenol derivative, for example, 1,4-diphenoxy benzene and 1,3-diphenoxy benzene can be mentioned. Furthermore, as the ethylene glycol derivative, for example, there can be mentioned 1,2-diphenoxy ethane, 1-(4-biphenylyloxy)-2-phenoxyethane and 1-(2-biphenylyloxy)-phenoxy ethane.

Moreover, as the terphenyl derivative, for example, there can be mentioned o-terphenyl, m-terphenyl, p-terphenyl, 2-methyl-o-terphenyl and 2,2-dimethyl-o-terphenyl. Furthermore, as the phosphate derivative, for example, triphenyl phosphate can be mentioned.

As the separator, for example, there can be mentioned a microporous membrane, a porous flat plate, and further, nonwoven fabric, which are made of polyolefin such as polyethylene (PE) and polypropylene (PP).

As the polymer gel electrolyte, one can be mentioned, which contains an electrolysis solution and a polymer that composes the polymer gel electrolyte in a ratio heretofore known in public. For example, from viewpoints of the ion conductivity and the like, desirably, a content of the electrolysis solution is approximately set at several % by mass to 98% by mass.

The polymer gel electrolyte is one in which the above-described electrolysis solution usually used in the lithium ion secondary battery is contained in the solid polymer electrolyte having the ion conductivity. However, the polymer gel electrolyte is not limited to this, and also includes one in which a similar electrolysis solution is held in a polymer skeleton that does not have the lithium ion conductivity. As a polymer, which is used for the polymer gel electrolyte and does not have the lithium ion conductivity, for example, polyvinylidene fluoride (PVdF), polyvinyl chloride (PVC), polyacrylonitrile (PAN), polymethyl methacrylate (PMA) and the like are usable. However, the polymer is not limited to these. Note that polyacrylonitrile (PAN), polymethyl methacrylate (PMA) and the like belong, if anything, to a category of materials in which the ion conductivity is hardly present, and accordingly, can also be said to be polymers having the above-described ion conductivity. However, here, polyacrylonitrile and polymethyl methacrylate are illustrated as such polymers which do not have the lithium ion conductivity.

As the solid polymer electrolyte, for example, those can be mentioned, which have a configuration formed by dissolving the above-described lithium salts into polyethylene oxide (PEO), polypropylene oxide (PPO) and the like, and do not contain the organic solvent. Hence, in the case where the electrolyte layer is composed of the solid polymer electrolyte, there is no concern about the liquid leakage from the battery, and reliability of the battery can be enhanced.

Preferably, a thickness of the electrolyte layer is thin from a viewpoint of reducing internal resistance. The thickness of the electrolyte layer is usually 1 to 100 μm, preferably 5 to 50 μm.

Note that a matrix polymer of the polymer gel electrolyte or the solid polymer electrolyte can develop excellent mechanical strength by forming a crosslinked structure. In order to form the crosslinked structure, a polymerizable polymer for forming the polymer electrolyte just needs to be subjected to polymerization treatment such as thermal polymerization, ultraviolet polymerization, radiation polymerization and electron beam polymerization by using an appropriate polymerization initiator. Note that, as the polymerizable polymer, for example, polyethylene oxide and polypropylene oxide can be mentioned.

[Manufacturing Method of Lithium Ion Secondary Battery]

Next, a description is made of an example of a manufacturing method of the lithium ion secondary battery according to this embodiment mentioned above.

First, the positive electrode is fabricated. For example, in the case of using a granular positive electrode active material, the positive electrode active material is mixed with the electric conducting additive, the binder and a viscosity adjusting solvent according to needs, whereby positive electrode slurry is prepared. Subsequently, this positive electrode slurry is coated on the positive electrode current collector, and is dried and pressure-molded, whereby the positive electrode active material layer is formed.

Moreover, the negative electrode is fabricated. For example, in the case of using a granular negative electrode active material, the negative electrode active material is mixed with the electric conducting additive, the binder and the viscosity adjusting solvent according to needs, whereby negative electrode slurry is prepared. Thereafter, this negative electrode slurry is coated on the negative electrode current collector, and is dried and pressure-molded, whereby the negative electrode active material layer is formed.

Subsequently, the positive electrode lead is attached to a plurality of the positive electrodes, in addition, the negative electrode lead is attached to a plurality of the negative electrodes, and thereafter, the positive electrodes, the separators and the negative electrodes are stacked on one another. Moreover, one in which these are stacked on one another is sandwiched by polymer-metal composite laminated sheets, and outer circumferential edge portions of the polymer-metal composite laminated sheets, each of which excludes one side, are heat-sealed, whereby a bag-like exterior body is formed. Thereafter, the above-described electrolysis solution is prepared, is injected from an opening portion of the exterior body to an inside thereof, and is sealed by heat-sealing the opening portion of the exterior body. In such a way, the laminate-type lithium ion secondary battery is completed.

Example 1

A description is made below in more detail of this embodiment by examples and comparative examples; however, the present invention is not limited to these examples.

Example 1-1

Preparation of First Active Material

The first active material (solid solution) was synthesized by the composite carbonate method. Specifically, as starting materials, sulfates of nickel, cobalt and manganese were used, and ion exchange water was added to the respective types of sulfates, whereby the respective types of aqueous sulfate solutions, in each of which a concentration was 2 mol/L, were prepared. Subsequently, the respective types of aqueous sulfate solutions were weighed so that nickel, cobalt and manganese could achieve a predetermined molar ratio, followed by mixing thereof, whereby an aqueous solution of the mixed sulfates was prepared.

Moreover, while stifling the aqueous solution of the mixed sulfates by a magnetic stirrer, an aqueous sodium carbonate ($Na_2CO_3$) solution was dropped into the aqueous solution of the mixed sulfates, and Ni—Co—Mn composite carbonate was precipitated. Note that, during a period while the aqueous sodium carbonate ($Na_2CO_3$) solution was being dropped, pH of the aqueous solution of the mixed sulfates was adjusted to 7 by using an aqueous ammonia solution with a concentration of 0.2 mol/L, which served as a pH regulating agent. Moreover, the composite carbonate thus obtained was aspirated and filtrated, was washed, was dried at 120° C. for 5 hours, and was calcined at 500° C. for 5 hours, whereby the Ni—Co—Mn composite oxide was obtained.

Moreover, in order that a predetermined molar ratio could be achieved, the obtained composite oxide was added with a little excess amount of lithium hydroxide ($LiOH.H_2O$), followed by pulverization and mixing. Thereafter, a resultant mixture was baked at 900° C. for 12 hours in the atmosphere, and was rapidly cooled by using liquid nitrogen, whereby $Li_{1.5}[Ni_{0.25}Co_{0.10}Mn_{0.85}[Li]_{0.3}]O_3$ as the first active material for use in this example was obtained. Note that, with regard to $Li_{1.5}[Ni_{0.25}Co_{0.10}Mn_{0.85}[Li]_{0.3}]O_3$ thus obtained, a=0.25, b=0.10, c=0.85, and d=0.3 in compositional formula (1).

Preparation of Second Active Material

The second active material was synthesized by the solid reaction method. Specifically, lithium carbonate and manganese oxide were used as starting materials. Subsequently, in order that lithium and manganese can establish a predetermined molar ratio, lithium carbonate and manganese oxide were weighed, pulverized and mixed with each other. Thereafter, a resultant mixture was baked at 1000° C. for 12 hours, and was further subjected to annealing treatment at 500° C. for 12 hours in an oxygen atmosphere, whereby $LiMn_2O_4$ as the second active material for use in this example was obtained. With regard to $LiMn_2O_4$, a'=0 in compositional formula (2).

<Preparation of Positive Electrode Active Material>

Powder of 85 mass parts of the first active material and power of 15 mass parts of the second active material were mixed with each other, whereby the positive electrode active material of this example was obtained.

<Fabrication of Positive Electrode>

85 mass parts of the positive electrode active material of this example, 7 mass parts of acetylene black and 3 mass parts of graphite which served as the electric conducting additives, and 5 mass parts of polyvinylidene fluoride, which served as the binder, were kneaded with one another. Then, to this kneaded product, N-methyl-2-pyrrolidone (NMP) was added and mixed, whereby positive electrode slurry was prepared. Next, on aluminum foil as the current collector, the obtained positive electrode slurry was coated so that an amount of the active material could be 10 mg per unit area of 100 mm², and was vacuum-dried at 120° C., whereby the positive electrode of this example was obtained. Note that the positive electrode was formed into a circular shape with a diameter of 15 mm.

<Fabrication of Lithium Ion Secondary Battery>

The positive electrode of this example and the negative electrode made of metal lithium were allowed to face each other, and two separators were arranged there between. Note that a material of the separators was polypropylene, and a thickness thereof was set at 20 μm. Subsequently, such a stacked body of the negative electrode, the separators and the positive electrode was arranged on a bottom side of a coin cell. Moreover, a gasket for keeping insulating properties between the positive electrode and the negative electrode was mounted, an electrolysis solution to be described below was injected by using syringe, a spring and a spacer were stacked, and an upper side of the coin cell was superimposed and crimped, whereby hermetic sealing was made. In such a way, the lithium ion secondary battery of this example was obtained.

Note that a standard of the above-described coin cell was CR2032, and stainless steel (SUS316) was used as a material thereof. Moreover, as the electrolysis solution, one was used, in which lithium hexafluorophosphate ($LiPF_6$) as the supporting salt was dissolved into an organic solvent so that a concentration thereof could be 1 mol/L. Moreover, as the organic solvent, one was used, in which ethylene carbonate (EC) and diethyl carbonate (DEC) were mixed with each other in a ratio of EC:DEC=1:2 (volume ratio).

<Evaluation of Charge/Discharge Characteristics of Lithium Ion Secondary Battery>

For the obtained lithium ion secondary battery, charge/discharge was performed at a constant current rate (rate of 1/12 C) by the constant current charge/discharge method in which the charge was continued until a maximum voltage of the battery became 4.8V and the discharge was continued until a minimum voltage of the battery became 2.0V. That is to say, the charge/discharge was performed under such conditions as shown in Table 1. At this time, an initial charge capacity and an initial discharge capacity were measured, and the initial charge/discharge efficiency was calculated. Obtained results are shown in Table 2, FIG. 2 and FIG. 3 together with a part of specifications.

TABLE 1

| State | Measurement temperature (K) | Voltage (V) Upper limit | Voltage (V) Lower limit | Current rate (C) | Time (h) | Mode | Repeat count (number of times) |
|---|---|---|---|---|---|---|---|
| Charge | 300 | 4.8 | — | 1/12 | 12 | Constant current | 10 |
| Discharge | 300 | — | 2.0 | 1/12 | 12 | Constant current | 10 |

TABLE 2

| Table 2 | First active material (mass %) | Second active material (mass %) | Initial charge (mAh/g) Charge | Initial charge (mAh/g) Discharge | Initial charge/discharge efficiency (%) |
|---|---|---|---|---|---|
| Example 1-1 | 85 | 15 | 278 | 251 | 90.3 |
| Example 1-2 | 90 | 10 | 298 | 266 | 89.3 |
| Example 1-3 | 95 | 5 | 311 | 271 | 87.1 |
| Comparative example 1-1 | 100 | 0 | 370 | 282 | 76.2 |

<Structure Analysis of First Active Material and Second Active Material>

For samples (powders) as parts of the obtained first active material and second active material, powder X-ray diffraction measurement was performed by using an X-ray diffraction device. Note that, as the X-ray diffraction device, MXP18VAHF made by Bruker AXS (former Mac Science) GmbH) was used. Moreover, with regard to measurement conditions, a voltage was set at 40 kV, a current was set at 200 mA, and an X-ray wavelength was set at Cu-Kα.

As a result of comparing the obtained results with data of a standard sample, the first active material and the second active material were the layered transition metal oxide in which the crystal structure belonged to the space group C2/m, and the spinel-type transition metal oxide in which the crystal structure belonged to the space group Fd-3m, respectively.

Example 1-2, Example 1-3 and Comparative example 1-1

In the preparation of the positive electrode active material of Example 1-1, the mixture ratio of the first active material and the second active material was changed as shown in Table 2. Except for the above, similar operations to those of Example 1-1 were repeated, whereby positive electrode active materials, positive electrodes and lithium ion secondary batteries of the respective examples were obtained. Then, in a similar way to Example 1-1, evaluations of the charge/discharge characteristics of the lithium ion secondary batteries were performed. Obtained results are shown in Table 2, FIG. 2 and FIG. 3.

Figure 2:
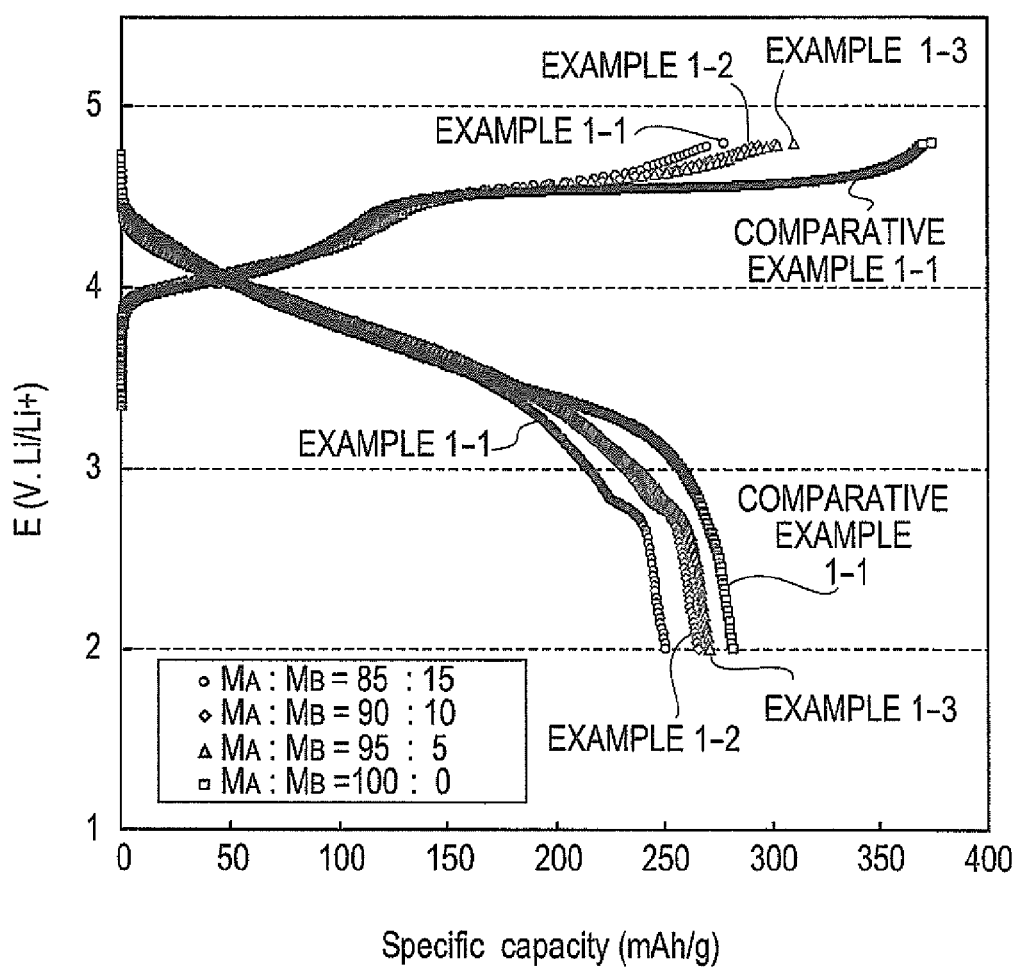
FIG. 2 is a graph showing charge/discharge curves of the respective examples and comparative examples in a first embodiment.

FIG. 2 shows charge/discharge curves of the respective examples. It was able to be confirmed that the capacity around 2.7V was increased in order from Example 1-1 to Example 1-2, and further, from Example 1-2 to Example 1-3. This is considered to be because, since the second active material ($LiMn_2O_4$) is the spinel-type transition metal oxide in which the crystal structure belongs to the space group Fd-3m, lithium is inserted into the second active material. Moreover, it was able to be confirmed that the charge capacity of each of Examples 1-1 to 1-3 was reduced more than in Comparative example 1-1 by the fact that the first active material ($Li_{1.5}[Ni_{0.25}Co_{0.10}Mn_{0.85}[Li]_{0.3}]O_3$) and the second active material ($LiMn_2O_4$) were mixed with each other.

Figure 3:
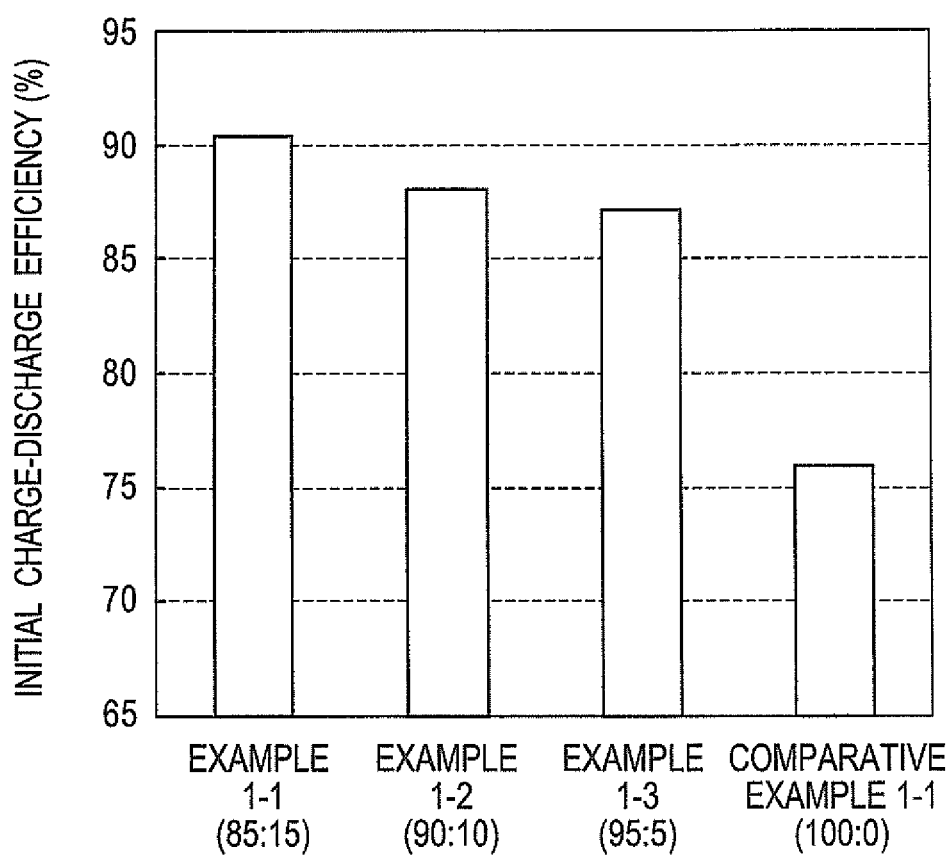
FIG. 3 is a graph showing initial charge/discharge efficiencies of the respective examples and comparative examples in the first embodiment.

In this connection, values obtained by dividing the initial discharge capacities of the respective examples by the initial charge capacities thereof, that is, [initial charge/discharge efficiency (%) (initial discharge capacity/initial charge capacity×100)] were summarized in FIG. 3. Note that, under illustrations of the respective examples, the content ratios ($M_A:M_B$) of the first active material and the second active material are shown in the mass ratio. While the initial charge/discharge efficiency of Comparative example 1-1 was 76.2%, the initial charge/discharge efficiencies of the respective Examples were 85% or more. Hence, it was confirmed that an initial irreversible capacity was reduced by the second active material as the spinel-type transition metal oxide in which the crystal structure belongs to the space group Fd-3m and the first active material composed of the transition metal oxide were mixed with each other. Then, following this, it was made possible to enhance the initial charge/discharge efficiency while maintaining a high capacity by maintaining a high reversible capacity.

Moreover, the reason why the initial charge/discharge efficiency was able to be enhanced as described above while maintaining the high capacity by reducing the initial irreversible capacity and maintaining the high reversible capacity is also considered to be that the range of d is set as: $0<d\leq0.45$, and that the range of a' is set as: $0\leq a'<2.0$. Furthermore, the reason why the initial charge/discharge efficiency was able to be enhanced as described above while maintaining the high capacity is also considered to be that the content ratio ($M_A:M_B$) of the first active material and the second active material is set so as to satisfy the relationships of expression (4) and expression (5).

Second Embodiment

Next, a description is made of a positive electrode active material for a lithium ion secondary battery according to a second embodiment of the present invention. In a similar way to the first embodiment, the positive electrode active material of this embodiment is a positive electrode active material containing a first active material and a second active material.

Then, the first active material (solid solution lithium-containing transition metal oxide) in this embodiment is represented by compositional formula (6):

$$Li_{1.5}[Ni_aCo_bMn_c[Li]_d]O_3 \quad (6)$$

wherein Li is lithium, Ni is nickel, Co is cobalt, Mn is manganese, and O is oxygen. Moreover, a, b, c and d satisfy relationships: $0.1 \leq d \leq 0.4$; $a+b+c+d=1.5$; and $1.1 \leq a+b+c \leq 1.4$.

Moreover, the first active material in this embodiment includes: a layered structure region, which is changed to a spinel structure by performing the charge or the charge/discharge in a potential range of 4.3V or more to 4.8V or less; and a layered structure region, which is not changed to the spinel structure thereby.

Furthermore, in the first active material in this embodiment, when a spinel structure change ratio in the case where $Li_2MnO_3$ in the layered structure region to be changed is entirely changed to $LiMn_2O_4$ with the spinel structure is defined as 1, the spinel structure change ratio is 0.25 or more to less than 1.0.

Moreover, the second active material (lithium-containing transition metal oxide) in this embodiment is represented by compositional formula (7):

$$LiM_{a'}Mn_{2-a'}O_4 \quad (7)$$

wherein Li is lithium, M is at least one selected from the group consisting of aluminum (Al), magnesium (Mg) and chromium (Cr), Mn is manganese, and O is oxygen. Moreover, a' satisfies a relationship: $0 \leq a' < 0.5$. The second active material has the spinel structure in a similar way to the first embodiment.

In the case where the positive electrode active material as described above is used for the lithium ion secondary battery, the positive electrode active material concerned is capable of realizing excellent discharge operation voltage and initial rate characteristics while maintaining a high discharge capacity. Therefore, the positive electrode active material is suitably used for the positive electrode for the lithium ion secondary battery and for the lithium ion secondary battery. Moreover, the positive electrode active material as described above exhibits a high capacity retention ratio particularly in a potential range of 3.0V or more to 4.5V or less. As a result, the positive electrode active material can be suitably used for such a lithium ion secondary battery for a drive power supply of a vehicle or for an auxiliary power supply thereof. Besides the above, the positive electrode active material is also sufficiently applicable for a lithium ion secondary battery for a home appliance or a mobile instrument.

Note that the "charge" refers to an operation of increasing a potential difference between electrodes continuously or step wise. Moreover, the "charge/discharge" refers to an operation of reducing the potential difference between the electrodes continuously or stepwise after the operation of increasing the potential difference between the electrodes continuously or stepwise, or refers to an operation of appropriately repeating these operations.

Here, in the first active material, preferably, in compositional formula (6), a, b, c and d satisfy the relationships: $0.1 \leq d \leq 0.4$; $a+b+c+d=1.5$; and $1.1 \leq a+b+c \leq 1.4$. In this case, the crystal structure in the first active material is stabilized.

Moreover, preferably, the first active material includes: the layered structure region, which is changed to the spinel structure by performing the charge or the charge/discharge in the potential range of 4.3V or more to 4.8V or less; and the layered structure region, which is not changed to the spinel structure thereby. In this case, it is made possible to realize both of the high discharge capacity and the high capacity retention ratio. Specifically, as will be described later, it is important to expose once or more the positive electrode, which contains the first active material, to a potential plateau section around 4.5V or more.

Moreover, in the case where the spinel structure change ratio mentioned above is 0.25 or more to less than 1.0 in the first active material, it is made possible to realize the high discharge capacity and capacity retention ratio and the excellent initial rate characteristics.

Here, in this specification, the "spinel structure change ratio" defines a ratio in which $Li_2MnO_3$ with the layered structure in the first active material is changed to $LiMn_2O_4$ with the spinel structure by performing the charge or the charge/discharge in such a predetermined potential range (4.3 to 4.8V). Then, when the spinel structure change ratio in the case where $Li_2MnO_3$ with the layered structure in the first active material is entirely changed to $LiMn_2O_4$ with the spinel structure is defined as 1. Specifically, the spinel structure change ratio is defined in the following expression.

$$\begin{bmatrix} \text{Spinel structure} \\ \text{change ratio (K)} \end{bmatrix} = \frac{[\text{Actual capacity of plateau region}]}{\begin{bmatrix} \text{Theoretical capacity } (Vs) \\ \text{caused by Li2MnO3} \\ \text{in first active material} \end{bmatrix} \times \begin{bmatrix} \text{Composition ratio } (x) \\ \text{of Li2MbO3 in} \\ \text{first active material} \end{bmatrix}} \quad [\text{Math. 1}]$$

Figure 4:
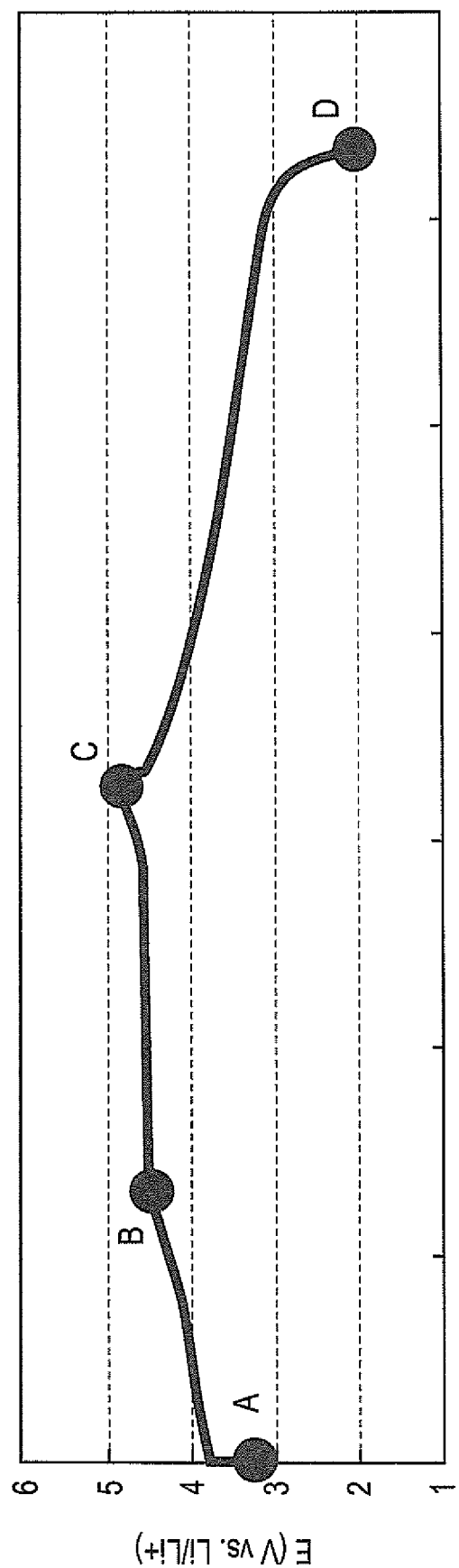
FIG. 4 is a graph explaining a definition of a change rate of a spinel structure.

A description is made of the definition of the "spinel structure change ratio" by taking the case as shown in FIG. 4 as an example. In FIG. 4, with regard to a battery assembled by using the positive electrode that uses the first active material as the positive electrode active material, a state where the battery is charged to 4.5V from an initial state A before the charge is started is defined as a charge state B. Furthermore, a state where the battery is charged to 4.8V from the charge state B through the plateau region is defined as an overcharge state C, and a state where the battery is discharged to 2.0V is defined as a discharge state D. Then, for the "actual capacity of plateau region" in the expression described above, an actual capacity of the first active material in the plateau region of FIG. 4 just needs to be measured. Note that, specifically, the plateau region is a region from 4.5V to 4.8V, and is a region caused by the fact that the crystal structure is changed. Therefore, an actual capacity $V_{BC}$ of the battery in a region BC from the charge state B to the overcharge state C corresponds to the actual capacity of the plateau region.

Moreover, in the first active material of compositional formula (6), an actual capacity $V_{AB}$ of a region AB from the initial state A to the charge state B where the battery is charged to 4.5V corresponds to a product of the composition ratio (y) of $LiMO_2$ as the layered structure region and a theoretical capacity ($V_L$) of LiMO$_2$. Moreover, the actual capacity $V_{BC}$ from the charge state B where the battery is charged to 4.5V to the overcharge state C where the battery is charged to 4.8V corresponds to a product of the composition ratio (x) of Li$_2$MnO$_3$ as the spinel structure region and a theoretical capacity ($V_s$) of Li$_2$MO$_3$. Therefore, when an actual capacity ($V_T$) measured from the initial state A to such a predetermined plateau region is defined as ($V_T=V_{AB}+V_{BC}$), the spinel structure change ratio can be calculated by using the following expression since relationships: $V_{AB}=y \times (V_L)$; and $V_{BC}=x \times (V_s) \times K$ are established. Note that M in compositional formula LiMO$_2$ is at least one selected from the group consisting of nickel (Ni), cobalt (Co) and manganese (Mn).

$$\left[\begin{array}{c} \text{Spinel structure} \\ \text{change ratio } (K) \end{array}\right] = \frac{\left[\begin{array}{c} \text{Actual capacity } (VT) \\ \text{measured to} \\ \text{plateau region} \end{array}\right] - \left[\begin{array}{c} \text{Theoretical capacity} \\ (VL) \text{ caused by} \\ \text{LiMO2 in first active material} \end{array}\right] \times \left[\begin{array}{c} \text{Composition ratio} \\ (y) \text{ of LiMO2 in} \\ \text{first active material} \end{array}\right]}{\left[\begin{array}{c} \text{Theoretical capacity } (Vs) \\ \text{caused by Li2MnO3} \\ \text{in first active material} \end{array}\right] \times \left[\begin{array}{c} \text{Composition ratio } (x) \\ \text{of Li2MnO3 in} \\ \text{first active material} \end{array}\right]} \quad [\text{Math. 2}]$$

Furthermore, the "composition ratio of Li$_2$MnO$_3$ in first active material" can be calculated from compositional formula (6) for the first active material. Specifically, in a first active material (1) in Example 2-1 to be described later, a compositional formula thereof is represented as: Li$_{1.5}$[Ni$_{0.45}$Mn$_{0.85}$[Li]$_{0.20}$]O$_3$ (a+b+c+d=1.5, d=0.20, a+b+c=1.30). In this case, the composition ratio of Li$_2$MnO$_3$ becomes 0.4, and the composition ratio of LiNi$_{1/2}$Mn$_{1/2}$O$_2$ becomes 0.6.

Note that whether or not the layered structure region and the spinel structure region are present in the first active material can be determined based on whether or not there are special peaks in the layered structure and the spinel structure, which are observed by the X-ray diffraction analysis. Moreover, the ratio of the layered structure region and the spinel structure region can be determined from the capacity measurement/calculation as mentioned above.

Moreover, suitably, the first active material in this embodiment satisfies relationships: $0.15 \le d \le 0.25$; a+b+c+d=1.5; and $1.25 \le a+b+c \le 1.35$ in compositional formula (6). The positive electrode active material of the first active material as described above is capable of realizing the excellent discharge operation voltage and initial rate characteristics while maintaining the higher discharge capacity.

Moreover, preferably, the first active material in this embodiment satisfies the relationships: $0.15 \le d \le 0.25$; a+b+c+d=1.5; and $1.25 \le a+b+c \le 1.35$ in compositional formula (6). Then, more suitably, the spinel structure change ratio obtained by performing the charge or the charge/discharge in the predetermined potential range is 0.65 or more to 0.85 or less. The positive electrode active material containing the first active material as described above is capable of realizing the excellent discharge operation voltage and initial rate characteristics while maintaining the higher discharge capacity. This is also considered to be because the stability of the crystal structure is excellent.

Moreover, in the first active material in this embodiment, preferably, a BET specific surface area thereof is 0.8 m$^2$/g or more to 10.0 m$^2$/g or less, and a 50%-penetration particle diameter (median diameter, D50) thereof is 20 μm or less. The BET specific surface area and the 50%-penetration particle diameter are set in such ranges as described above, whereby the first active material is capable of realizing the excellent discharge operation voltage and initial rate characteristics while maintaining the high discharge capacity, the high capacity retention ratio and the high initial charge/discharge efficiency. That is to say, in the case where the BET specific surface area is 0.8 m$^2$/g or more, diffusivity of the lithium ions from an inside of a bulk in the crystal structure is suppressed from being lowered, whereby it is made possible to realize the high initial charge/discharge efficiency and the excellent initial rate characteristics. Moreover, in the case where the BET specific surface area is 10.0 m$^2$/g or less, and the 50%-penetration particle diameter is 20 μm or less, the capacity retention ratio can be suppressed from being lowered.

Next, by taking an example, a description is made in detail of a production method of the first active material in the positive electrode active material according to an embodiment of the present invention.

As a production method of a precursor of the first active material, the carbonate method (composite carbonate method) can be applied. Specifically, first, as starting materials, the respective sulfates, nitrates or the like of nickel (Ni), cobalt (Co) and manganese (Mn) are prepared, predetermined amounts thereof are weighed, and an aqueous mixed solution thereof is prepared.

Subsequently, to this aqueous mixed solution, ammonia water is dropped until pH thereof can become 7, and further, an aqueous sodium carbonate (Na$_2$CO$_3$) solution is dropped, and Ni—Co—Mn composite carbonate is precipitated. Note that, during a period while the aqueous Na$_2$CO$_3$ solution is being dropped, pH of the aqueous mixed solution is held at 7 by using ammonia water.

Then, the precipitated composite carbonate is aspirated and filtrated, is washed, is thereafter dried, and is calcined. With regard to drying conditions, the composite carbonate just needs to be dried at 100 to 150° C. for 2 to 10 hours (for example, at 120° C. for 5 hours) in the atmosphere; however, the drying conditions are not limited to this range. With regard to calcining conditions, the composite carbonate just needs to be calcined at 360 to 600° C. for 3 to 10 hours (for example, at 500° C. for 5 hours) in the atmosphere; however, the calcining conditions are not limited to this range.

Furthermore, such powder thus calcined is added with a little excess amount of lithium hydroxide (LiOH.H$_2$O), followed by mixing. Thereafter, a resultant mixture is baked, whereby the precursor of the first active material can be prepared. With regard to baking conditions, for example, the resultant mixture just needs to be baked at 700 to 1000° C. (for example, 800 to 900° C.) for approximately 3 to 20 hours (for example, 12 hours). Note that, preferably, after being baked, the resultant mixture is rapidly cooled by using liquid nitrogen. This is because such rapid cooling using liquid nitrogen and the like, which is performed after baking, is preferable for reactivity and cycle stability.

Then, the first active material of this embodiment can be obtained by performing oxidation treatment for the above-described precursor. As the oxidation treatment, for example, there can be mentioned: (1) charge/discharge in predetermined potential range; (2) oxidation by oxidizing agent corresponding to charge; (3) oxidation using redox mediator; and the like. Here, (1) charge or charge/discharge in predetermined potential range specifically refers to charge or charge/discharge from a low potential range in which a large change of the crystal structure of the first active material is not brought about from the beginning. Moreover, as (2) oxidizing agent, for example, halogens of bromine, chlorine and the like can be mentioned.

Here, a relatively simple method among the above-described (1) to (3) oxidation treatments is an oxidation treatment method of the above-described (1). Then, as the oxidation treatment of (1), effective is charge or charge/discharge, which is performed so that the potential cannot exceed a predetermined maximum potential, after the battery is fabricated by using the precursor of the first active material, which is obtained as mentioned above, that is, effective is charge/discharge pretreatment in which the potential is regulated. Note that the charge or the charge/discharge may be performed so that the potential cannot exceed the predetermined maximum potential after the electrode or a structure corresponding to the electrode is fabricated by using the precursor of the first active material, which is obtained as mentioned above. In such a way, such a positive electrode active material, in which the high discharge capacity and the capacity retention ratio are realized, can be obtained.

As such a charge/discharge pretreatment method in which the potential is regulated, desirably, the charge/discharge is performed for 1 to 30 cycles under conditions where a maximum potential (upper limit potential of the charge/discharge, which is converted to lithium metal) in a predetermined potential range for lithium metal as a counter electrode becomes 4.3V or more to 4.8V or less. Desirably, the charge/discharge is performed for 1 to 30 cycles under conditions where the maximum potential becomes, more preferably, 4.4V or more to 4.6V or less. The oxidation treatment by the charge/discharge is performed within the above-described range, whereby the high charge capacity and capacity retention ratio can be realized. In particular, since the capacity is increased after the above-described oxidation treatment (charge/discharge pretreatment in which the potential is regulated), a particularly remarkable capacity retention ratio can be developed effectively in the case where the charge or the charge/discharge is performed while setting the maximum potential at approximately 4.8V. Note that the above-described potential converted to the lithium metal corresponds to a potential, which takes, as a reference, a potential shown by the lithium metal in the electrolysis solution in which the lithium ions is dissolved by 1 mol/L.

Moreover, after the charge/discharge within the above-described predetermined potential range for the lithium metal as the counter electrode is performed for 1 to 30 cycles, desirably, the maximum potential of the predetermined potential range of the charge/discharge is further increased stepwise. In particular, in the case of using the battery to a capacity with such a potential as high as 4.7V and 4.8V vs. Li, the maximum potential of such a charge/discharge potential in the oxidation treatment is increased stepwise, whereby durability of the electrode can be improved even in oxidation treatment for a short time.

In the event of increasing the maximum potential (upper limit potential) of the charge/discharge stepwise, the number of cycles required for the charge/discharge in each step is not particularly limited; however, effectively, is within a range of 1 to 10 times. Moreover, in the event of increasing the maximum potential of the charge/discharge stepwise, the total number of charge/discharge cycles in the oxidation treatment process, that is, the number of times, which is obtained by summing up the number of cycles required for the charge/discharge in each step, is not particularly limited; however, effectively, is within a range of 4 times to 20 times.

Moreover, in the event of increasing the maximum potential of the charge/discharge stepwise, a gain (increase margin) of the potential in each step is not particularly limited; however, effectively, is 0.05V to 0.1V.

Furthermore, in the event of increasing the maximum potential of the charge/discharge stepwise, effectively, a final maximum potential (termination maximum potential) is set at 4.6 to 4.9V. However, the termination maximum potential is not limited to the above-described range, and the charge/discharge pretreatment may be performed up to a higher termination maximum potential if the above-described effects can be exerted.

A minimum potential of the predetermined potential range of the charge/discharge is not particularly limited, and is 2V or more to less than 3.5V, more preferably, 2V or more to 3V or less for the lithium metal as the counter electrode. The oxidation treatment (charge/discharge pretreatment in which the potential is regulated) by the charge or the charge/discharge is performed within the above-described range, whereby the high charge capacity and capacity retention ratio can be realized. Note that the potential (V) of the above-described charge/discharge refers to a potential per single cell.

Moreover, a temperature of the electrode that performs the charge/discharge as the oxidation treatment (charge/discharge pretreatment in which potential is regulated; electrochemical pretreatment) can be set arbitrarily as long as the functions and effects of the present invention are not damaged. Note that, from a viewpoint of economy, desirably, the oxidation treatment is performed at room temperature (25° C.) at which special heating and cooling are not required. Meanwhile, from viewpoints that a larger capacity can be developed, and that it is possible to enhance the capacity retention ratio by short-time charge/discharge treatment, desirably, the oxidation treatment is performed at a temperature higher than the room temperature.

Furthermore, a process to which the oxidation treatment (charge/discharge pretreatment; electrochemical pretreatment) is applied is not particularly limited. For example, the oxidation treatment as described above can be performed as described above in the state where the battery is configured or in the electrode or in the configuration corresponding to the electrode. That is to say, the oxidation treatment may be applied in any of the state of the powder of the positive electrode active material, the configuration of the electrode, and the assembly of the battery in combination with the negative electrode. The application of the oxidation treatment to the battery can be carried out by applying oxidation treatment conditions in consideration of a potential profile of an electric capacity of the negative electrode to be combined with the positive electrode concerned.

Here, the case of the state where the battery is configured is superior to implementation of the oxidation treatment for each electrode or for each configuration corresponding to the electrode in that the oxidation treatment for many electrodes can be performed once and collectively. Meanwhile, in the case of performing the oxidation treatment for each of the electrodes or for each of the configurations corresponding to the electrode, it is easier to control the conditions for the oxidation potential and the like than in the state of configuring the battery. Furthermore, such a method of performing the oxidation treatment for each of the electrodes is excellent in that variations in degree of oxidation to the individual electrodes are less likely to occur.

Note that the oxidizing agent for use in the oxidation treatment method of (2) described above is not particularly limited, and for example, halogens of bromine, chlorine and the like can be used. These oxidizing agents may be each used singly or may be used in combination. With regard to the oxidation by the oxidizing agent, for example, fine particles of the first active material are dispersed into a solvent into which the first active material is not dissolved, and the oxidizing agent is blown into a dispersion solution concerned, whereby the first active material can be gradually oxidized.

Moreover, in compositional formula (7) for the second active material, in the case where M is at least one selected from the group consisting of aluminum (Al), magnesium (Mg) and chromium (Cr), and a' satisfies the relationship: $0 \leq a' < 0.5$, the second active material can take a stable spinel structure.

Moreover, in the second active material in the positive electrode active material of this embodiment, preferably, a BET specific surface area thereof is 0.2 m²/g or more to 3.0 m²/g or less, and a 50%-penetration particle diameter (median diameter, D50) thereof is 20 μm or less.

The BET specific surface area and the 50%-penetration particle diameter are set in such ranges as described above, whereby the second active material is capable of realizing the excellent discharge operation voltage and initial rate characteristics while maintaining the high discharge capacity and charge/discharge efficiency. For example, in the case where the BET specific surface area is 0.2 m²/g or more, the diffusivity of the lithium ions from the inside of the bulk in the crystal structure is suppressed from being lowered, whereby it is made possible to realize the high initial charge/discharge efficiency and the excellent initial rate characteristics. Moreover, for example, in the case where the BET specific surface area is 3.0 m²/g or less, and the 50%-penetration particle diameter is 20 μm or less, the capacity retention ratio can be suppressed from being lowered.

Furthermore, in the positive electrode active material of this embodiment, preferably, the first active material and the second active material satisfy a relationship of the following expression (8):

$$0 < M_B/(M_A + M_B) < 0.45 \qquad (8)$$

wherein $M_A$ is a mass of the first active material and $M_B$ is a mass of the second active material.

The relationship between the first active material and the second active material is set in such a range as described above, whereby it is made possible to realize the excellent discharge operation voltage and initial rate characteristics while maintaining the higher discharge capacity. Moreover, the initial charge/discharge efficiency also becomes excellent.

Specific configurations of the positive electrode for the lithium ion secondary battery, which uses the positive electrode active material according to this embodiment of the present invention, and of the lithium ion secondary battery concerned, and in addition, a manufacturing method of the lithium ion secondary battery concerned are similar to those of the first embodiment, and accordingly, a detailed description thereof is omitted.

Example 2

A description is made below in more detail of this embodiment by examples and comparative examples; however, the present invention is not limited to these examples.

Example 2-1

Synthesis of First Active Material (1)

The first active material (1) was synthesized by using the composite carbonate method. As starting materials, sulfates of nickel (Ni) and manganese (Mn) were used, and an aqueous nickel sulfate solution and an aqueous manganese sulfate solution, in each of which a concentration was 2 mol/L, were prepared. As a precipitant, an aqueous sodium carbonate solution with a concentration of 2 mol/L was used, and as a pH regulating agent, an aqueous ammonia solution with a concentration of 0.2 mol/L was used.

Next, the aqueous nickel sulfate solution and the aqueous manganese sulfate solution were mixed with each other so that nickel and manganese could be mixed in a ratio of a compositional formula shown below, whereby an aqueous composite sulfate solution was prepared. Then, the above-described aqueous sodium carbonate solution was dropped into the aqueous composite sulfate solution stirred by a magnetic stirrer, whereby a precursor was precipitated. Thereafter, the precursor was aspirated and filtrated, and a precipitate deposited on filter paper was dried, whereby a precursor of composite hydroxide was obtained.

Thereafter, the obtained precursor of the composite hydroxide and lithium carbonate were mixed with each other in a predetermined molar ratio. Then, after being calcined at 500° C., a resultant mixture was baked at 800° C. to 1000° C. for 12 hours to 24 hours in the atmosphere, whereby a target sample was obtained.

<Composition of First Active Material (1)>

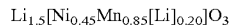 Compositional formula: $Li_{1.5}[Ni_{0.45}Mn_{0.85}[Li]_{0.20}]O_3$ $(a+b+c+d=1.5, d=0.20, a+b+c=1.30)$ <Synthesis of Second Active Material>

The second active material was synthesized by the solid phase method. As starting materials, manganese oxide, lithium carbonate and aluminum hydroxide were used. Predetermined amounts of the manganese oxide, the lithium carbonate and the aluminum hydroxide were weighed so as to achieve a ratio of the following compositional formula, and the manganese oxide, the lithium carbonate and the aluminum hydroxide were mixed with one another by using an agate mortar and a pestle. Then, an obtained mixture was baked at 1000° C. for 12 hours in the atmosphere, and was thereafter subjected to annealing treatment at 600° C. for 10 hours under an oxygen atmosphere, whereby a target sample was obtained.

<Composition of Second Active Material>

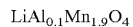 Compositional formula: $LiAl_{0.1}Mn_{1.9}O_4$

<Preparation of Slurry for Positive Electrode>

5.5 mass parts of the binder were dissolved into 49.5 mass parts of NMP, whereby a binder solution was prepared. Next, 55.0 mass parts of the binder solution were added to mixed powder of 5.5 mass parts of the electric conducting additive and 100 mass parts of the positive electrode active material, a resultant was kneaded by a planetary mixer, and thereafter, 24.5 mass parts of NMP were added to an kneaded product, whereby slurry for the positive electrode was obtained. A solid content concentration of the obtained slurry for the positive electrode was 60% by mass. Note that, as the planetary mixer, HIVIS MIX Model 2P-03 made by PRIMIX Corporation was used.

<Composition of Slurry for Positive Electrode>

Positive electrode active material: first active material (1) 75 mass parts, second active material 25 mass parts Electric conducting additive: scale-like graphite 2.0 mass parts, acetylene black 3.5 mass parts Binder: polyvinylidene fluoride (PVDF) 5.5 mass parts Solvent: N-methylpyrrolidone (NMP) 74 mass parts <Coating/Drying of Slurry for Positive Electrode>

On one surface of a current collector composed of aluminum foil with a thickness of 20 µm, the obtained slurry for the positive electrode was coated by a bar coater. Subsequently, this current collector coated with the slurry for the positive electrode was dried at 120 to 130° C. for 10 minutes on a hot plate, and an amount of NMP remaining in the positive electrode active material layer was set at 0.02% by mass or less.

<Press of Positive Electrode>

The obtained sheet-like positive electrode was press-molded by using a roll press, followed by cutting. In such a way, a positive electrode C1 was obtained, in which weight of the positive electrode active material layer on one surface was approximately 3.5 mg/cm$^2$, a thickness thereof was approximately 50 µm, and a density thereof was 2.70 g/cm$^3$.

<Drying of Positive Electrode>

Next, by using this positive electrode C1, drying treatment was performed in a vacuum drying furnace. Specifically, after the positive electrode C1 was placed in an inside of the drying furnace, a pressure of the inside was reduced (to 100 mm Hg ($1.33 \times 10^4$ Pa)) at room temperature (25° C.), and air in the drying furnace was removed. Subsequently, while flowing nitrogen gas through the inside, temperature was raised to 120° C. at a rate of 10° C./min., and at 120° C., the pressure was reduced one more time. Then, the positive electrode C1 was held for 12 hours while leaving nitrogen in the furnace evacuated, and thereafter, the temperature was dropped to the room temperature, whereby a positive electrode C11 was obtained. Note that a flow rate at which the nitrogen gas was flown through the inside of the furnace was set at 100 cm$^3$/min.

<Fabrication of Lithium Ion Secondary Battery>

The positive electrode C11 fabricated in Example 2-1 was punched to a diameter of φ15 mm. Thereafter, before fabricating the battery, the positive electrode C11 was dried one more time at 100° C. for 2 hours by a vacuum dryer. Moreover, the porous membrane of polypropylene, the coin cell members and the like were used after being dried in advance at the room temperature for 24 hours or more in a glove box with an argon gas atmosphere.

Then, in the glove box with the argon gas atmosphere, the positive electrode and the negative electrode made of the metal lithium were allowed to face each other, and two separators were arranged there between. Note that a material of the separators thus used is polypropylene, and a thickness thereof is 20 µm.

Subsequently, such a stacked body of the negative electrode, the separators and the positive electrode was arranged on a bottom side of a coin cell (CR2032, material: stainless steel (SUS316)). Furthermore, a gasket for keeping the insulating properties between the positive electrode and the negative electrode was mounted, and 150 µL of an electrolysis solution to be described below was injected by using a syringe. Thereafter, a spring and a spacer were stacked, and an upper side of the coin cell was superimposed and crimped, whereby hermetic sealing was made. In such a way, the lithium ion secondary battery was fabricated. Note that a standard of the above-described coin cell was CR2032, and stainless steel (SUS316) was used as a material thereof. Moreover, as the electrolysis solution, one was used, in which lithium hexafluorophosphate (LiPF$_6$) as the supporting salt was dissolved into an organic solvent so that a concentration thereof could be 1 mol/L. Moreover, as the organic solvent, one was used, in which ethylene carbonate (EC) and diethyl carbonate (DEC) were mixed with each other in a ratio of EC:DEC=1:2 (volume ratio). Note that a special additive and the like were not added to the electrolysis solution concerned.

Thereafter, the above-described battery element was set on a cell attachment jig for evaluation, and the positive electrode lead and the negative electrode lead were attached to the respective tab end portions of the battery element, and then a test was carried out.

<Electrochemical Pretreatment>

First, the charge and discharge of the above-described lithium ion secondary battery were performed. The charge was performed by the constant current and constant voltage charge (CCCV) method, in which the charge was performed at a rate of 0.1 C until the maximum voltage of the battery became 4.2V, and thereafter, the maximum voltage was held for approximately 24 hours. Moreover, the discharge was performed by the constant current discharge (CC) method, in which the discharge was performed at a rate of 1.0 C until the minimum voltage of the battery became 2.5V.

Next, as shown in Table 3, a constant current charge/discharge cycle, in which the charge was performed at a rate of 0.1 C until the maximum voltage became 4.5V, and thereafter, the discharge was performed at a rate of 0.1 C until the minimum voltage became 2.0V, was carried out twice (Pattern 1). Next, a constant current charge/discharge cycle, in which the charge was performed at a rate of 0.1 C until the maximum voltage became 4.6V, and thereafter, the discharge was performed at a rate of 0.1 C until the minimum voltage became 2.0V, was carried out once (Pattern 2). Furthermore, a constant current charge/discharge cycle, in which the charge was performed at a rate of 0.1 C until the maximum voltage became 4.7V, and thereafter, the discharge was performed at a rate of 0.1 C until the minimum voltage became 2.0V, was carried out once (Pattern 3). Subsequently, a constant current charge/discharge cycle, in which the charge was performed at a rate of 0.1 C until the maximum voltage became 4.8V, and thereafter, the discharge was performed at a rate of 0.1 C until the minimum voltage became 2.0V, was carried out once (Pattern 4). Finally, a cycle, in which the constant current and constant voltage charge was performed at a rate of 0.1 C until the maximum voltage became 4.8V, and thereafter, the constant current discharge was performed at a rate of 0.1 C until the minimum voltage became 2.0V, was carried out once (Pattern 5). All of the patterns were performed at the room temperature. In such a way as described above, a lithium ion secondary battery of this example was obtained.

TABLE 3

| Pattern | State (—) | Lower limit voltage (V) | Upper limit voltage (V) | Current rate (C) | Time (h) | Mode (—) | Repeat count (number of times) |
|---|---|---|---|---|---|---|---|
| 1 | charge | — | 4.5 | 0.1 | 15 | CC | 2 |
|   | discharge | 2.0 | — | 0.1 | 15 | CC |   |
| 2 | charge | — | 4.6 | 0.1 | 15 | CC | 1 |
|   | discharge | 2.0 | — | 0.1 | 15 | CC |   |
| 3 | charge | — | 4.7 | 0.1 | 15 | CC | 1 |
|   | discharge | 2.0 | — | 0.1 | 15 | CC |   |
| 4 | charge | — | 4.8 | 0.1 | 15 | CC | 1 |
|   | discharge | 2.0 | — | 0.1 | 15 | CC |   |
| 5 | charge | — | 4.8 | 0.1 | 15 | CCCV | 1 |
|   | discharge | 2.0 | — | 0.1 | 15 | CC |   |

Example 2-2

In the composition of the slurry for the positive electrode, such a content ratio of the first active material (1) was set at 50 mass parts, and such a content ratio of the second active material was set at 50 mass parts. Except for the above, similar operations to those of Example 2-1 were repeated, whereby a lithium ion secondary battery of this example was obtained.

Example 2-3

In the composition of the slurry for the positive electrode, the content ratio of the first active material (1) was set at 25 mass parts, and the content ratio of the second active material was set at 75 mass parts. Except for the above, similar operations to those of Example 2-1 were repeated, whereby a lithium ion secondary battery of this example was obtained.

Example 2-4

Synthesis of First Active Material (2)

The first active material (2) was synthesized by using the composite carbonate method. As starting materials, sulfates of nickel (Ni) cobalt (Co) and manganese (Mn) were used, and an aqueous nickel sulfate solution, an aqueous cobalt sulfate solution and an aqueous manganese sulfate solution, in each of which a concentration was 2 mol/L, were prepared. As a precipitant, an aqueous sodium carbonate solution with a concentration of 2 mol/L was used, and as a pH regulating agent, an aqueous ammonia solution with a concentration of 0.2 mol/L was used.

Next, the aqueous nickel sulfate solution, the aqueous cobalt sulfate solution and the aqueous manganese sulfate solution were mixed with one another so that nickel, cobalt and manganese could be mixed in a ratio of a compositional formula shown below, whereby an aqueous composite sulfate solution was prepared. Then, the aqueous sodium carbonate solution was dropped into the aqueous composite sulfate solution stirred by a magnetic stirrer, whereby a precursor was precipitated. Thereafter, the precursor was aspirated and filtrated, and a precipitate deposited on filter paper was dried, whereby a precursor of composite hydroxide was obtained.

Thereafter, the obtained precursor of the composite hydroxide and lithium carbonate were mixed with each other in a predetermined molar ratio. Then, a resultant mixture was calcined at 500° C., and was then baked at 800° C. to 1000° C. for 12 hours to 24 hours in the atmosphere, whereby a target sample was obtained.

<Composition of First Active Material (2)>

$Li_{1.5}[Ni_{0.25}Co_{0.25}Mn_{0.75}[Li]_{0.25}]O_3$     compositional formula:

$(a+b+c+d=1.5, d=0.20, a+b+c=1.25)$

In the composition of the slurry for the positive electrode, such a content ratio of the first active material (2) was set at 75 mass parts, and such a content ratio of the second active material was set at 25 mass parts. Except for the above, similar operations to those of Example 2-1 were repeated, whereby a lithium ion secondary battery of this example was obtained.

Example 2-5

In the composition of the slurry for the positive electrode, the content ratio of the first active material (2) was set at 50 mass parts, and the content ratio of the second active material was set at 50 mass parts. Except for the above, similar operations to those of Example 2-1 were repeated, whereby a lithium ion secondary battery of this example was obtained.

Example 2-6

In the composition of the slurry for the positive electrode, the content ratio of the first active material (2) was set at 25 mass parts, and the content ratio of the second active material was set at 75 mass parts. Except for the above, similar operations to those of Example 2-1 were repeated, whereby a lithium ion secondary battery of this example was obtained.

Comparative Example 2-1

In the composition of the slurry for the positive electrode, the content ratio of the first active material (1) was set at 100 mass parts. Except for the above, similar operations to those of Example 2-1 were repeated, whereby a lithium ion secondary battery of this example was obtained.

Comparative Example 2-2

In the composition of the slurry for the positive electrode, the content ratio of the first active material (2) was set at 100 mass parts. Except for the above, similar operations to those of Example 2-1 were repeated, whereby a lithium ion secondary battery of this example was obtained.

Comparative Example 2-3

In the composition of the slurry for the positive electrode, the content ratio of the second active material was set at 100 mass parts. Except for the above, similar operations to those of Example 2-1 were repeated, whereby a lithium ion secondary battery of this example was obtained.

Specifications of the positive electrode active materials of Examples 2-1 to 2-6 and Comparative examples 2-1 to 2-3 are shown in Table 4.

difference of the charge capacity in the main charge/discharge cycle; and the charge/discharge capacity in the final charge. That is to say, the charge/discharge efficiency (%) is represented by [discharge capacity in final discharge in main charge/discharge cycle]/[total sum of difference of charge capacity in charge/discharge cycle at time of electrochemi-

TABLE 4

| | Positive electrode active material | | | | | | | | | | | | |
|---|---|---|---|---|---|---|---|---|---|---|---|---|---|
| | First active material | | | | | Second active material | | | | | | | |
| | Type (—) | Spinel structure change ratio (K) (—) | BET specific surface area (m²/g) | 50%-penetration particle diameter (D50) (μm) | Content ratio (%) | BET specific surface area (m²/g) | 50%-penetration particle diameter (D50) (μm) | Content ratio (%) | MB/ (MA + MB) | Discharge capacity (0.1 C) (mAh/g) | Charge/ discharge efficiency (%) | Average voltage (V) | Rate characteristics (2.5 C/ 0.1 C) (%) |
| Example 2-1 | A1 | 0.86 | 1.38 | 6.40 | 75 | 0.73 | 10.30 | 25 | 0.25 | 230.8* | 87.6* | 3.73* | 79.3* |
| Example 2-2 | A1 | 0.86 | 1.38 | 6.40 | 50 | 0.73 | 10.30 | 50 | 0.50 | 187.1* | 90.7* | 3.76* | 81.5* |
| Example 2-3 | A1 | 0.86 | 1.38 | 6.40 | 25 | 0.73 | 10.30 | 75 | 0.75 | 153.2* | 91.1 | 3.78 | 83.7* |
| Example 2-4 | A2 | 0.84 | 2.60 | 6.20 | 75 | 0.73 | 10.30 | 25 | 0.25 | 226.2* | 86.7* | 3.71* | 78.5* |
| Example 2-5 | A2 | 0.84 | 2.60 | 6.20 | 50 | 0.73 | 10.30 | 50 | 0.50 | 183.4* | 89.8* | 3.74* | 80.7* |
| Example 2-6 | A2 | 0.84 | 2.60 | 6.20 | 25 | 0.73 | 10.30 | 75 | 0.75 | 150.1* | 90.2 | 3.76 | 82.9* |
| Comparative example 2-1 | A1 | 0.86 | 1.38 | 6.40 | 100 | — | | 0 | 0 | 235.5 | 84.3 | 3.68 | 76.7 |
| Comparative example 2-2 | A2 | 0.84 | 2.60 | 6.20 | 100 | — | | 0 | 0 | 220.8 | 83.3 | 3.65 | 72.7 |
| Comparative example 2-3 | — | — | — | — | 0 | 0.73 | 10.30 | 100 | 1 | 120.5 | 94.1 | 3.81 | 85.1 |

[Performance Evaluation]
<Discharge Capacity and Average Voltage>

For the lithium ion secondary batteries of the above-described respective examples, as shown in Table 5, a cycle, in which the constant current and constant voltage charge was performed at a rate of 0.1 C until the maximum voltage became 4.8V, and thereafter, the constant current discharge was performed at a rate of 0.1 C until the minimum voltage became 2.0V, was carried out twice. At this time, a discharge capacity and average voltage of each of the batteries were measured and calculated. Note that, in the present invention, the discharge operation voltage was evaluated by the average voltage. Obtained results are shown in Table 4 in combination.

cal pretreatment, difference of charge capacity in main charge/discharge cycle and charge/discharge capacity in final charge]. Obtained results are shown in Table 4 in combination.

<Rate Characteristics>

For the lithium ion secondary battery of each of the above-described examples, charge/discharge cycles shown in Table 6 were implemented. First, a cycle, in which the constant current and constant voltage charge was performed at a rate of 0.1 C until the maximum voltage became 4.8V, and thereafter, the constant current discharge was performed at a rate of 0.1 C until the minimum voltage became 2.0V, was carried out twice (Pattern 1). Next, a cycle, in which the constant current and constant voltage charge was performed

TABLE 5

| Pattern | State (—) | Lower limit voltage (V) | Upper limit voltage (V) | Current rate (C) | Time (h) | Mode (—) | Repeat count (number of times) |
|---|---|---|---|---|---|---|---|
| 1 | charge | — | 4.8 | 0.1 | 15 | CCCV | 2 |
| | discharge | 2.0 | — | 0.1 | 15 | CC | |

<Charge/Discharge Efficiency>

Moreover, for the lithium ion secondary battery of each of the above-described examples, the charge capacity and the discharge capacity were measured in the electrochemical pretreatment and the main charge/discharge cycle. At this time, the charge/discharge efficiency was calculated from a ratio of the discharge capacity in the final discharge in the main charge/discharge cycle with respect to a total sum of: a difference of the charge capacity in the charge/discharge cycle at the time of the electrochemical pretreatment; a at a rate of 0.1 C until the maximum voltage became 4.8V, and thereafter, the constant current discharge was performed at a rate of 0.5 C until the minimum voltage became 2.0V, was carried out twice (Pattern 2). Furthermore, a cycle, in which the constant current and constant voltage charge was performed at a rate of 0.1 C until the maximum voltage became 4.8V, and thereafter, the constant current discharge was performed at a rate of 1 C until the minimum voltage became 2.0V, was carried out twice (Pattern 3). Thereafter, a cycle, in which the constant current and constant voltage charge was performed at a rate of 0.1 C until the maximum voltage became 4.8V, and thereafter, the constant current discharge was performed at a rate of 2.5 C until the minimum voltage became 2.0V, was carried out twice (Pattern 4). Finally, a cycle, in which the constant current and constant voltage charge was performed at a rate of 0.1 C until the maximum voltage became 4.8V, and thereafter, the constant current discharge was performed at a rate of 0.1 C until the minimum voltage became 2.0V, was carried out twice (Pattern 5). All of the patterns were performed at the room temperature.

At this time, the charge capacity of the battery in each of the rates was measured, whereby the capacity retention ratio was calculated. Then, the initial rate characteristics were calculated from a ratio of the capacity retention ratio at the rate of 2.5 C with respect to the capacity retention ratio at the rate of 0.1 C. Obtained results are shown in Table 4 in combination.

TABLE 6

| Pattern | State (—) | Lower limit voltage (V) | Upper limit voltage (V) | Current rate (C) | Time (h) | Mode (—) | Repeat count (number of times) |
|---|---|---|---|---|---|---|---|
| 1 | charge | — | 4.8 | 0.1 | 15 | CCCV | 2 |
|   | discharge | 2.0 | — | 0.1 | 15 | CC | |
| 2 | charge | — | 4.8 | 0.1 | 15 | CCCV | 2 |
|   | discharge | 2.0 | — | 0.5 | 15 | CC | |
| 3 | charge | — | 4.8 | 0.1 | 15 | CCCV | 2 |
|   | discharge | 2.0 | — | 1.0 | 15 | CC | |
| 4 | charge | — | 4.8 | 0.1 | 15 | CCCV | 2 |
|   | discharge | 2.0 | — | 2.5 | 15 | CC | |
| 5 | charge | — | 4.8 | 0.1 | 15 | CCCV | 2 |
|   | discharge | 2.0 | — | 0.1 | 15 | CC | |

From Table 4, it is understood that, in comparison with Comparative example 2-1 to Comparative example 2-3, Example 2-1 to Example 2-6 are capable of realizing the excellent discharge operation voltage and initial rate characteristics while maintaining the high discharge capacity. In particular, in the results shown in Table 4, results affixed with "*" show those improved more than arithmetic mean values corresponding to a mixture ratio of the first active material and the second active material, the arithmetic mean values being obtained from the result of Comparative example 2-1 or Comparative example 2-2. At the present point of time, it is considered that Example 2-1 and Example 2-4 are particularly excellent.

Moreover, the reason why Examples 2-1 and 2-4, in particular Example 2-1, are capable of realizing the excellent discharge operation voltage and initial rate characteristics while maintaining the high discharge capacity in comparison with Comparative example 2-1 to Comparative example 2-3 is also considered to be that Examples 2-1 and 2-4 satisfy the relationship of expression (8).

Note that, with regard to the first active material taken out by disassembling the lithium ion secondary battery of each of the examples, it was confirmed that the first active material concerned had the layered structure region and the spinel structure region based on the presence of the special peaks in the layered structure and the spinel structure, which were observed by the X-ray diffraction analysis (XRD). Moreover, with regard to the second active material taken out by disassembling the lithium ion secondary battery of each of the examples, it was confirmed that the second active material concerned had the layered structure region based on the presence of the special peak in the layered structure, which was observed by the X-ray diffraction analysis (XRD).

Note that these structures may be confirmed by the electron beam diffraction analysis, and the composition of each of the examples can be confirmed, for example, an inductively coupled plasma emission analyzer (ICP emission analyzer).

The description has been made above of the present invention by the embodiments and the example; however, the present invention is not limited to these, and is modifiable in various ways within the scope of the spirit of the present invention.

That is to say, in the above-described embodiments and examples, the lithium ion secondary battery is illustrated as the electric device; however, the present invention is not limited to this, and can also be applied to other types of secondary batteries, and further, to a primary battery. Moreover, the present invention can be applied not only to such batteries but also to a lithium ion capacitor. That is to say, the positive electrode for an electric device according to the present invention and the electric device according thereto just need to be those, each of which includes the predetermined first active material and second active material as the positive electrode active material, and other constituents are not particularly limited.

For example, the present invention can be applied not only to the above-mentioned laminate-type battery but also to forms and structures, which have been heretofore known in public, and include a button-type battery and a can-type battery. Moreover, for example, the present invention can be applied not only to the above-mentioned stack-type (flat-type) battery but also to a roll-type (cylinder-type) battery and the like.

Moreover, for example, in terms of an electric connection form in the lithium ion secondary battery, the present invention can be applied not only to the above-mentioned battery of the type in which the parallel connection is made in an inside but also to a bipolar battery and the like. That is to say, the present invention can also be applied to a battery of a type in which a series connection is made in an inside. Note that, in general, a battery element in the bipolar battery has a configuration, in which a plurality of bipolar electrodes and a plurality of electrolyte layers are stacked on each other, each of the bipolar electrodes having a negative electrode active material layer formed on one surface of a current collector, and a positive electrode active material layer formed on other surface thereof.

INDUSTRIAL APPLICABILITY

In accordance with the present invention, there are allowed to coexist: the first active material that has the crystal structure containing extra lithium, which is irreversible; and the second active material that has the crystal structure having the defect or the site, into which lithium is insertable. Therefore, there can be provided: the positive electrode active material for an electric device, which is capable of exerting the excellent initial charge/discharge efficiency while maintaining the high capacity by maintaining the high reversible capacity; and the positive electrode for an electric device, and the electric device, each of which uses the positive electrode active material.

The invention claimed is:

1. A positive electrode active material for an electric device, the positive electrode active material comprising:
a first active material composed of a transition metal oxide represented by compositional formula (1):

$$Li_{1.5}[Ni_aCo_bMn_c[Li]_d]O_3 \quad (1)$$

wherein Li is lithium, Ni is nickel, Co is cobalt, Mn is manganese, O is oxygen, a, b, c and d satisfy relationships: $0.1 \leq d \leq 0.4$; $a+b+c+d=1.5$; and $1.1 \leq a+b+c \leq 1.4$, the first active material having:
a layered crystal structure region that has been changed to a spinel type crystal structure by performing charge or charge/discharge in a potential range of 4.3V or more to 4.8V or less with a spinel type crystal structure change ratio of 0.25 or more to less than 1.0, the spinel type crystal structure change ratio representing an amount of $Li_2MnO_3$ type crystal structure that is changed to spinel $LiMn_2O_4$ type crystal structure in the layered structure; and
a layered crystal structure region that is not changed to the spinel type crystal structure; and
a second active material composed of a spinel-type transition metal oxide represented by compositional formula (2) and having a crystal structure belonging to a space group Fd-3m:

$$LiM_{a'}Mn_{2-a'}O_4 \quad (2)$$

wherein, in formula (2), Li is lithium, M is at least one selected from the group consisting of aluminum, magnesium and chromium, Mn is manganese, O is oxygen, and a' satisfies a relationship: $0 \leq a' \leq 0.5$, wherein:
a content ratio of the first active material and the second active material satisfies, in a mass ratio, a relationship represented by expression (3):

$$100:0 < M_A:M_B < 0:100 \quad (3)$$

wherein $M_A$ is a mass of the first active material, and $M_B$ is a mass of the second active material;
a BET specific surface of the first active material is 0.8 m²/g or more to 10.0 m²/g or less; and
a median diameter of the first active material is 20 μm or less.

2. The positive electrode active material for an electric device according to claim 1, wherein the content ratio of the first active material and the second active material satisfies, in the mass ratio, a relationship represented by expression (4):

$$100:0 < M_A:M_B < 50:50 \quad (4)$$

wherein $M_A$ is the mass of the first active material and $M_B$ is the mass of the second active material.

3. The positive electrode active material for an electric device according to claim 1, wherein the content ratio of the first active material and the second active material satisfies, in the mass ratio, a relationship represented by expression (5):

$$100:0 < M_A:M_B < 85:15 \quad (5)$$

wherein $M_A$ is the mass of the first active material and $M_B$ is the mass of the second active material.

4. The positive electrode active material for an electric device according to claim 1, wherein, in the formula (1), a, b, c and d of the first active material satisfy relationships: $0.15 \leq d \leq 0.25$; $a+b+c+d=1.5$; and $1.25 \leq a+b+c \leq 1.35$.

5. The positive electrode active material for an electric device according to claim 1,
wherein, in the formula (1), a, b, c and d of the first active material satisfy relationships: $0.15 \leq d \leq 0.25$; $a+b+c+d=1.5$; and $1.25 \leq a+b+c \leq 1.35$, and
the spinel structure change ratio is 0.65 or more to 0.85 or less.

6. The positive electrode active material for an electric device according to claim 1, wherein a BET specific surface of the second active material is 0.2 m²/g or more to 3.0 m²/g or less, and
a median diameter of the second active material is 20 μm or less.

7. The positive electrode active material for an electric device according to claim 1, wherein the first active material and the second active material satisfy a relationship represented by expression (6):

$$0 < M_B/(M_A+M_B) < 0.45 \quad (6)$$

wherein $M_A$ is the mass of the first active material and $M_B$ is the mass of the second active material.

8. A positive electrode for an electric device, comprising: the positive electrode active material according to claim 1.

9. An electric device, comprising: the positive electrode for an electric device according to claim 8.

10. The electric device according to claim 9, wherein the electric device is a lithium ion secondary battery.

* * * * *